US012809888B2

(12) United States Patent
Aroskar et al.

(10) Patent No.: US 12,809,888 B2
(45) Date of Patent: Nov. 24, 2026

(54) METHOD, APPARATUS, AND SYSTEM FOR MODEL PARAMETER SWITCHING FOR DYNAMIC OBJECT DETECTION

(71) Applicant: HERE Global B.V., Eindhoven (NL)

(72) Inventors: Amey Aroskar, North Aurora, IL (US); Sanjay Kumar Boddhu, Aurora, IL (US); Luke Smoron, Chicago, IL (US); Erika Rodwell, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 977 days.

(21) Appl. No.: 17/637,361

(22) PCT Filed: Aug. 28, 2020

(86) PCT No.: PCT/US2020/048558
§ 371 (c)(1),
(2) Date: Feb. 22, 2022

(87) PCT Pub. No.: WO2021/041921
PCT Pub. Date: Mar. 4, 2021

(65) Prior Publication Data

US 2022/0276618 A1 Sep. 1, 2022

Related U.S. Application Data

(60) Provisional application No. 62/893,581, filed on Aug. 29, 2019, provisional application No. 62/893,599, filed on Aug. 29, 2019.

(51) Int. Cl.
*G06F 16/29* (2019.01)
*G05B 13/02* (2006.01)
(Continued)

(52) U.S. Cl.
CPC ......... *G06F 16/29* (2019.01); *G05B 13/0265* (2013.01); *G06N 3/098* (2023.01);
(Continued)

(58) Field of Classification Search
CPC ....... G06F 16/29; G06F 8/44; G05B 13/0265; G06N 3/098; G06N 20/20; G06V 20/58
See application file for complete search history.

(56) References Cited

U.S. PATENT DOCUMENTS 10,816,973 B2 * 10/2020 Jiang .................. B60W 60/001
11,073,401 B1 * 7/2021 Blanc-Paques ........ G01C 21/32
(Continued)

FOREIGN PATENT DOCUMENTS

WO 2021041921 A1 3/2021

OTHER PUBLICATIONS

International Search Report and Written Opinion of the International Searching Authority for related International Application No. PCT/US2020/048558, dated Feb. 2, 2021, 15 pages.
(Continued)

*Primary Examiner* — Omar F Fernandez Rivas
*Assistant Examiner* — Corey M Sackalosky
(74) *Attorney, Agent, or Firm* — DITTHAVONG. STEINER & MLOTKOWSKI

(57) ABSTRACT

An approach is provided for providing dynamic model switching and/or model parameter switching (e.g., for object detection). The approach, for example, involves providing a plurality of machine learning models trained to detect one or more objects (e.g., vehicles, pedestrians, etc.) and/or road attributes (e.g., road hazards, road furniture, road signs, etc.). The approach also involves processing sensor data to determine at least one context (e.g., location), at least one use of the one or more road attributes, or a combination thereof. The approach further involves selecting at least one machine learning model of the plurality of machine learning models based on at least one context. The approach further
(Continued)

involves providing the selected at least one machine learning model to detect the one or more objects and/or road attributes.

20 Claims, 16 Drawing Sheets

(51) Int. Cl.

| | |
|---|---|
| ***G06F 8/41*** | (2018.01) |
| ***G06N 3/098*** | (2023.01) |
| ***G06N 20/20*** | (2019.01) |
| ***G06V 20/58*** | (2022.01) |

(52) U.S. Cl.

CPC ............ *G06N 20/20* (2019.01); *G06V 20/58* (2022.01); *G06F 8/44* (2013.01)

(56) References Cited

U.S. PATENT DOCUMENTS

| | | | | |
|---|---|---|---|---|
| 2014/0223284 | A1 | 8/2014 | Rankin, Jr. et al. | |
| 2018/0082152 | A1 | 3/2018 | Katz et al. | |
| 2018/0114101 | A1 | 4/2018 | Desai et al. | |
| 2019/0197354 | A1 * | 6/2019 | Law | G06N 3/04 |
| 2019/0213451 | A1 * | 7/2019 | Schäfer | G06V 10/82 |
| 2021/0097311 | A1 * | 4/2021 | McBeth | G08G 1/096775 |

OTHER PUBLICATIONS

Office Action for related European Patent Application No. 20856087.0-1207, dated Jun. 30, 2023, 9 pages.

Office Action for related European Application No. 20856087.0-1218, dated Nov. 3, 2025, 5 pages.

* cited by examiner

Dynamic model switching

400

500

METHOD, APPARATUS, AND SYSTEM FOR MODEL PARAMETER SWITCHING FOR DYNAMIC OBJECT DETECTION

RELATED APPLICATIONS

This application claims priority from U.S. Provisional Application Ser. No. 62/893,581, entitled "METHOD, APPARATUS, AND SYSTEM FOR MODEL SWITCHING FOR DYNAMIC OBJECT DETECTION," U.S. Provisional Application Ser. No. 62/893,599, entitled "METHOD, APPARATUS, AND SYSTEM FOR MODEL PARAMETER SWITCHING FOR DYNAMIC OBJECT DETECTION," both filed on Aug. 29, 2019, and the PCT Application Serial No. PCT/US2020/048558, entitled "METHOD, APPARATUS, AND SYSTEM FOR MODEL PARAMETER SWITCHING FOR DYNAMIC OBJECT DETECTION," filed on Aug. 28, 2020, the contents of which are hereby incorporated herein in their entirety by this reference.

BACKGROUND

Modern location-based services and applications (e.g., autonomous driving and other location-based application) are increasingly demanding fast and accurate object detection (e.g., detection of road hazards, road furniture, road signs, etc.). However, the diversity of objects (e.g., road-related objects) and the environments in which the objects occur present significant technical challenges to providing machine-based object detection.

Some Example Embodiments

Therefore, there is a need for an approach for dynamic object detection model switching based on device location and/or other contextual parameters to utilize the most optimum model based on the context (e.g., a location, machine learning model parameter(s), etc.).

According to one embodiment, a computer-implemented method comprises providing a plurality of machine learning models trained to detect one or more road attributes (e.g., road hazards, road furniture, road signs, etc.). The method also comprises processing sensor data to determine at least one context (e.g., location), at least one use of the one or more road attributes, or a combination thereof. The method further comprises selecting at least one machine learning model of the plurality of machine learning models based on at least one context. The method further comprises providing the selected at least one machine learning model to detect the one or more road attributes.

According to another embodiment, an apparatus comprises at least one processor, and at least one memory including computer program code for one or more computer programs, the at least one memory and the computer program code configured to, with the at least one processor, cause, at least in part, the apparatus to provide a plurality of machine learning models trained to detect one or more road attributes (e.g., road hazards, road furniture, road signs, etc.). The apparatus is also caused to process sensor data to determine at least one context (e.g., location), at least one use of the one or more road attributes, or a combination thereof. The apparatus is further caused to select at least one machine learning model of the plurality of machine learning models based on at least one context. The apparatus is further caused to provide the selected at least one machine learning model to detect the one or more road attributes.

According to another embodiment, a non-transitory computer-readable storage medium carries one or more sequences of one or more instructions which, when executed by one or more processors, cause, at least in part, an apparatus to provide a plurality of machine learning models trained to detect one or more road attributes (e.g., road hazards, road furniture, road signs, etc.). The apparatus is also caused to process sensor data to determine at least one context (e.g., location), at least one use of the one or more road attributes, or a combination thereof. The apparatus is further caused to select at least one machine learning model of the plurality of machine learning models based on at least one context. The apparatus is further caused to provide the selected at least one machine learning model to detect the one or more road attributes.

According to another embodiment, an apparatus comprises means for providing a plurality of machine learning models trained to detect one or more road attributes (e.g., road hazards, road furniture, road signs, etc.). The apparatus also comprises means for processing sensor data to determine at least one context (e.g., location), at least one use of the one or more road attributes, or a combination thereof. The apparatus further comprises means for selecting at least one machine learning model of the plurality of machine learning models based on at least one context. The apparatus further comprises means for providing the selected at least one machine learning model to detect the one or more road attributes.

According to one embodiment, a computer-implemented method comprises providing a machine learning model zoo comprising a plurality of regional machine learning models. The plurality of regional machine learning models provides a common base functionality based on a plurality of respective regional differences. The method also comprises determining a context of a device. The method further comprising selecting a regional machine learning model from the plurality of regional machine learning models based on the context. The method further comprising instantiating the selected regional machine learning model in the device.

According to another embodiment, an apparatus comprises at least one processor, and at least one memory including computer program code for one or more computer programs, the at least one memory and the computer program code configured to, with the at least one processor, cause, at least in part, the apparatus to provide a machine learning model zoo comprising a plurality of regional machine learning models. The plurality of regional machine learning models provides a common base functionality based on a plurality of respective regional differences. The apparatus is also caused to determine a context of a device. The apparatus is further caused to select a regional machine learning model from the plurality of regional machine learning models based on the context. The apparatus is further caused to instantiate the selected regional machine learning model in the device.

According to another embodiment, a non-transitory computer-readable storage medium carries one or more sequences of one or more instructions which, when executed by one or more processors, cause, at least in part, an apparatus to process sensor data to provide a machine learning model zoo comprising a plurality of regional machine learning models. The plurality of regional machine learning models provides a common base functionality based on a plurality of respective regional differences. The apparatus is also caused to determine a context of a device. The apparatus is further caused to select a regional machine learning model from the plurality of regional machine learning models learning models based on the context. The apparatus is further caused to instantiate the selected regional machine learning model in the device.

According to another embodiment, an apparatus comprises means for providing a machine learning model zoo comprising a plurality of regional machine learning models. The plurality of regional machine learning models provides a common base functionality based on a plurality of respective regional differences. The apparatus also comprises means for determining a context of a device. The apparatus further comprises means for selecting a regional machine learning model from the plurality of regional machine learning models based on the context. The apparatus further comprises means for instantiating the selected regional machine learning model in the device.

According to one embodiment, a computer-implemented method comprises determining a context associated with a use of a machine learning model at a device. The method also comprises selecting a parameter set from a plurality of parameter sets associated with the machine learning model based on the context. The plurality of parameters sets specify a plurality of respective parameter values to change at least one confidence threshold of the machine learning model. The method further comprising configuring the machine learning model based on the selected parameter set to perform a base functionality under the determined context.

According to another embodiment, an apparatus comprises at least one processor, and at least one memory including computer program code for one or more computer programs, the at least one memory and the computer program code configured to, with the at least one processor, cause, at least in part, the apparatus to determine a context associated with a use of a machine learning model at a device. The apparatus is also caused to select a parameter set from a plurality of parameter sets associated with the machine learning model based on the context. The plurality of parameters sets specify a plurality of respective parameter values to change at least one confidence threshold of the machine learning model. The apparatus is further caused to configure the machine learning model based on the selected parameter set to perform a base functionality under the determined context.

According to another embodiment, a non-transitory computer-readable storage medium carries one or more sequences of one or more instructions which, when executed by one or more processors, cause, at least in part, an apparatus to determine a context associated with a use of a machine learning model at a device. The apparatus is also caused to select a parameter set from a plurality of parameter sets associated with the machine learning model based on the context. The plurality of parameters sets specify a plurality of respective parameter values to change at least one confidence threshold of the machine learning model. The apparatus is further caused to configure the machine learning model based on the selected parameter set to perform a base functionality under the determined context.

According to another embodiment, an apparatus comprises means for determining a context associated with a use of a machine learning model at a device. The apparatus also comprises means for selecting a parameter set from a plurality of parameter sets associated with the machine learning model based on the context. The plurality of parameters sets specify a plurality of respective parameter values to change at least one confidence threshold of the machine learning model. The apparatus further comprises means for configuring the machine learning model based on the selected parameter set to perform a base functionality under the determined context.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

According to one embodiment, a computer-implemented method comprises processing sensor data to determine at least one characteristic of a camera, a vehicle on which the camera is mounted, an environment in which the camera is operated, or a combination thereof. The method also comprises automatically changing at least one model parameter of a machine learning model based on the least one characteristic. The method further comprising providing the machine learning model with the changed at least one model parameter for object detection.

According to another embodiment, an apparatus comprises at least one processor, and at least one memory including computer program code for one or more computer programs, the at least one memory and the computer program code configured to, with the at least one processor, cause, at least in part, the apparatus to process sensor data to determine at least one characteristic of a camera, a vehicle on which the camera is mounted, an environment in which the camera is operated, or a combination thereof. The apparatus is also caused to automatically change at least one model parameter of a machine learning model based on the least one characteristic. The apparatus is further caused to provide the machine learning model with the changed at least one model parameter for object detection.

According to another embodiment, a non-transitory computer-readable storage medium carries one or more sequences of one or more instructions which, when executed by one or more processors, cause, at least in part, an apparatus to process sensor data to determine at least one characteristic of a camera, a vehicle on which the camera is mounted, an environment in which the camera is operated, or a combination thereof. The apparatus is also caused to automatically change at least one model parameter of a machine learning model based on the least one characteristic. The apparatus is further caused to provide the machine learning model with the changed at least one model parameter for object detection.

According to another embodiment, an apparatus comprises means for processing sensor data to determine at least one characteristic of a camera, a vehicle on which the camera is mounted, an environment in which the camera is operated, or a combination thereof. The apparatus also comprises means for automatically changing at least one model parameter of a machine learning model based on the least one characteristic. The apparatus further comprises means for providing the machine learning model with the changed at least one model parameter for object detection.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Figure 1:
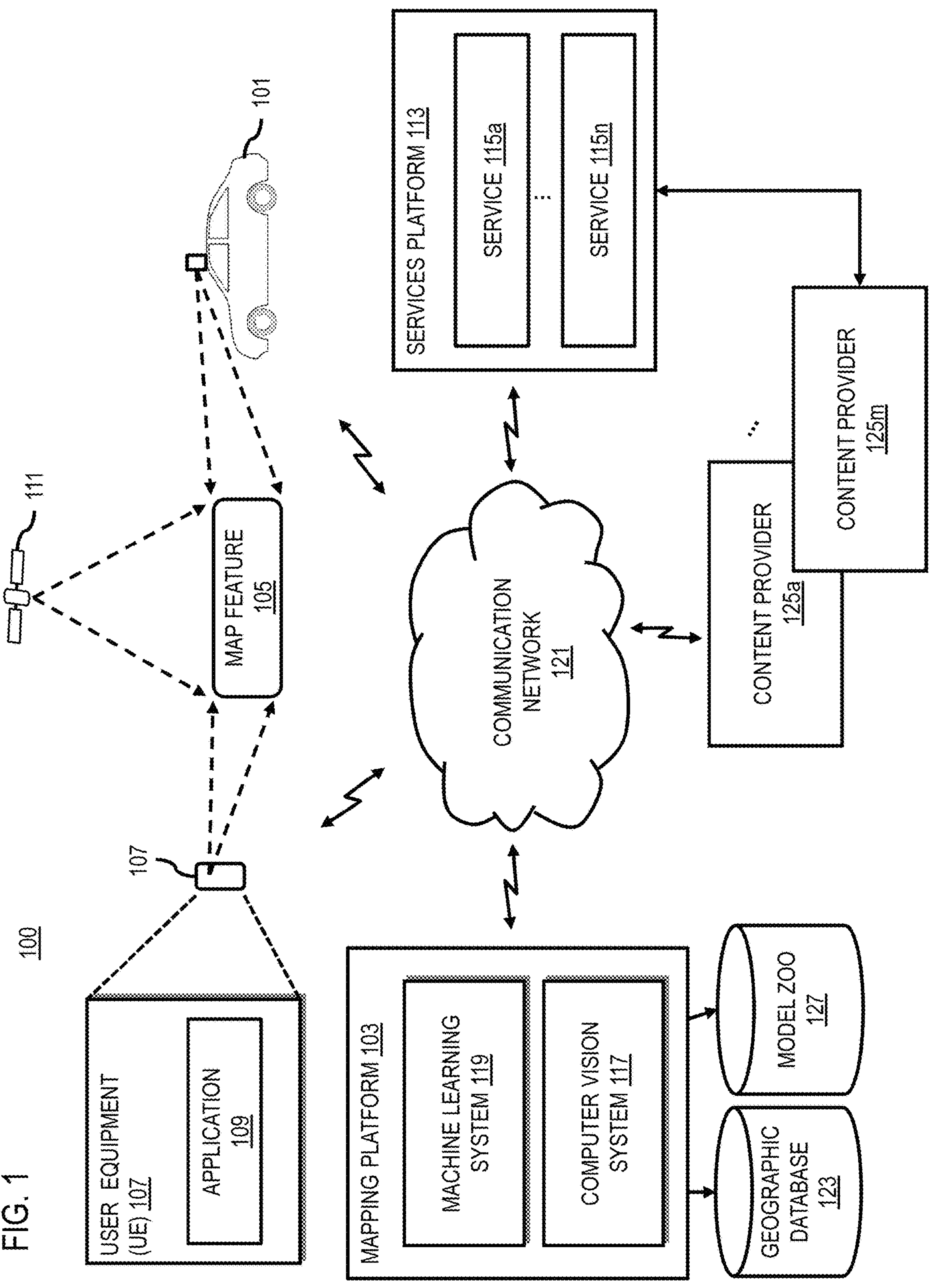
FIG. 1 is a diagram of a system capable of dynamic model switching and/or model parameter switching, according to one embodiment.

Examples of a method, apparatus, and computer program for model switching for dynamic object detection are provided. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

The embodiments described herein relate to a machine learning (ML) model zoo that is a part of a software development kit (SDK) used for compiling an application package for execution by user devices. By way of example, the model zoo contains multiple ML based models for various attributes like road hazard detection, road furniture detection, road signs classification and detection, etc. that will enable a user (e.g., a vehicle driver), using an app based on the SDK, to detect various attributes, be alerted of and avoid any hazards on the road. The above-mentioned ML based models are trained on a global dataset. Although the SDK and/or the model zoo (e.g., can have a collection of different ML models that may contain regional models for better edge detection based on regional nuances, the regional models are not dynamically utilized in user applications.

By way of example, many location-based services and applications rely on accurate map data. Modern location-based services and applications (e.g., autonomous driving) are increasingly demanding highly accurate and detailed digital map data (e.g., centimeter-level accuracy or better) across wide geographic areas. To achieve such levels of coverage, map service providers have relied on data (e.g., imagery) collected from a variety of sources with different views or perspectives (e.g., top down imagery from aerial cameras, and ground-level imagery for surface vehicles, etc.). Map service providers can then, for instance, identify common semantic features or objects (e.g., lane markings, signs, etc.) across the image views for map making, localization, and/or other similar location-based services.

However, image data collected by different sensor systems at different locations or contexts may carry different errors and/or nuances. For example, images taken by satellites 111, aerial and drone images, etc., from a top down perspective, can be used to precisely determine the location of roads, objects (e.g., vehicles, pedestrians, etc.) on the roads, and other features (e.g., map feature 105) on the Earth. Nevertheless, these image data may suffer from orbit errors, satellites/drone clock errors, etc.

Ground sources like cars, robots, mobiles devices (e.g., user equipment (UE) 107) fitted with sensor systems (e.g., cameras) are also used to acquire image data and build a mapping model using perception algorithms (e.g., an application 109). Processing ground sources generally requires more effort and resources on a regional scale, yet detecting more detailed map features 105 like traffic lights, signs etc., which may not be visible from a top down image or source. In one embodiment, map feature correspondences across different sources enable aggregating maps made from both top down and ground level sources for better accuracy and more completeness.

Figure 2A:
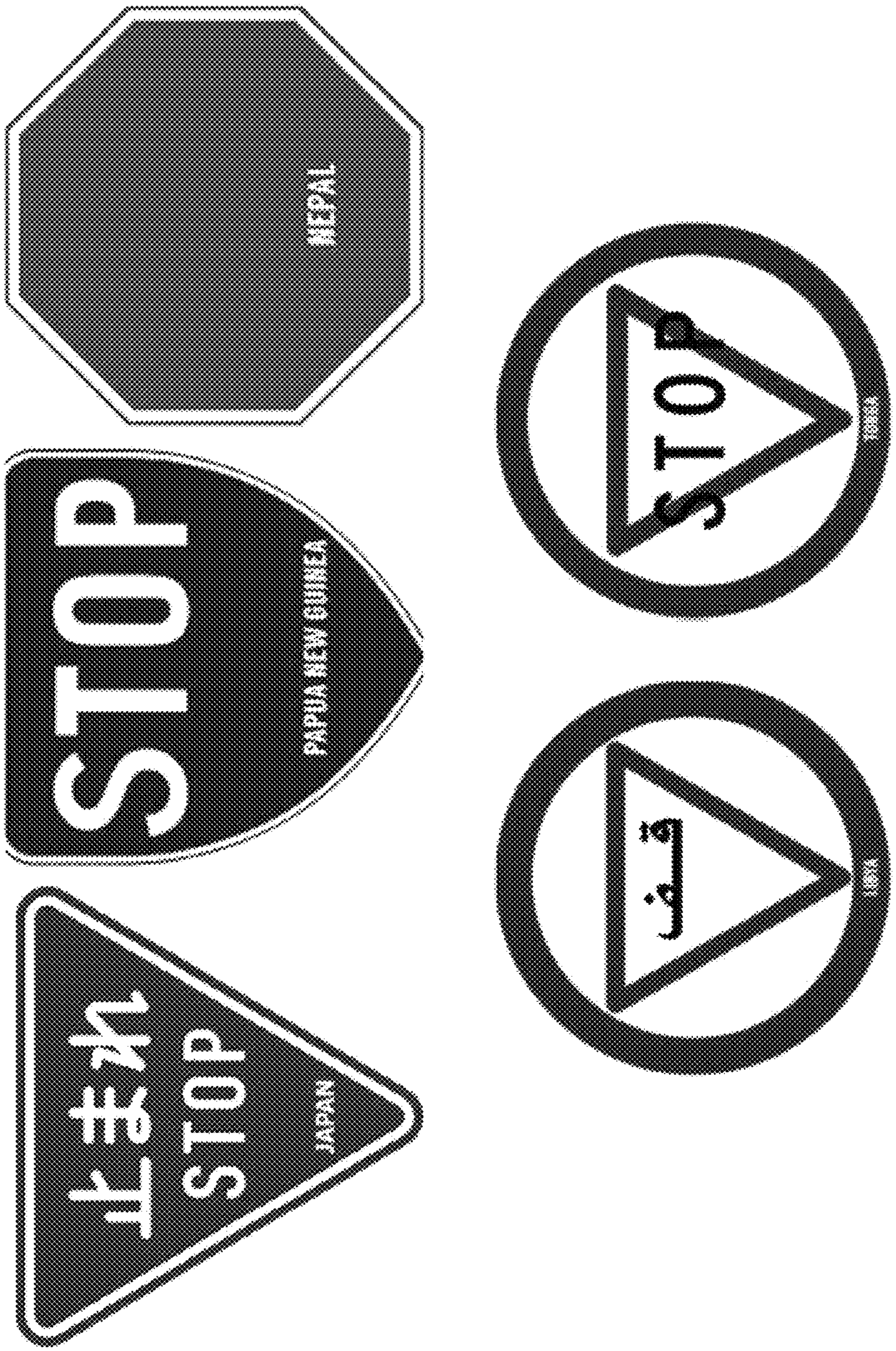
FIG. 2A is a diagram of example stop signs of different countries, according to one embodiment.

By way of example, the map features 105 usually carry different regional nuances. For example, there are many traffic signs of the same meaning but with different looks around the world. Although most countries use English for their safety signs, some countries use only their language for traffic sign making. FIG. 2A is a diagram of example stop signs of different countries, according to one embodiment. Most stop signs have an octagonal shape, but some stop signs contain a upside down triangle, a circle with an upside down triangle therein, etc. As another example, pedestrian and/or animal crossing signs vary depending on countries.

In addition, traffic rules and/or driving behaviors vary tremendously from one country to another, including right and left-hand traffic, speed limits, etc. For instance, although people in the world mostly drive on the right, people in more than 70 countries drive on the left (e.g., Australia, India, South Africa, UK, etc.). Some country may have their own road regulations. For example, in Sweden, daytime running light must remain turned on both day and night. As another example, in India, when a cow is standing across the road, wait until it clears the road. In addition, driver/vehicle behaviors vary among countries, such as lane merging, vehicle braking, driving extremely close, tailgate, etc. in China.

Rather than using a global ML model in a user application, or relying on a user to download different user applications tailored for different countries/regions, it is more efficient to provide a user application that can dynamically utilize different regional ML models. The models can be pre-loaded, real-time retrieved from the cloud, or built-in in a user device.

Additionally, besides qualitatively adjusting model parameters (e.g., a region of interest, camera zoom/rotation, etc.) of detection algorithms for different object types, there is a need to quantitatively adjust model parameters to improve accuracy or precision.

To address these problems, the system 100 of FIG. 1 introduces a capability for dynamically switching to the best ML model from multiple available ML models based on location, model parameters, intended use of the detections, etc. For example, in an autonomous driving use case, the system 100 may require vehicles (e.g., an autonomous vehicle 101) to perceive the world with an accurate semantic understanding in order to obey driving rules and avoid collisions. In this example, the system 100 can operate a mapping platform 103 to creates highly accurate and up-to-date high-resolution map for automated driving, based on different sources of raw data (e.g., image data). In this example, images taken by satellites 111, aerial and drone images, etc., from a top down perspective, is used to precisely determine map feature 105 (e.g., the location of roads, and other features) on the Earth. Ground sources like cars, robots, user equipment (UE) 107 (e.g., mobiles devices) fitted with sensor systems (e.g., cameras) are also used to acquire image data for building a mapping model using perception algorithms (e.g., an application 109). Processing ground sources generally requires more effort and resources on a city scale, yet detecting more detailed map features 105 like traffic lights, signs etc. which may not be visible from a top down image or source. For high definition map use (e.g., with centimeter level accuracy), the system 100 can map the features in an area using both top down and ground level sources. By way of example, the system 100 can use front facing camera of an edge device (e.g., the vehicle 101, the UE 107, etc.) to detect objects, map features, and behaviors that can lead to hazardous situations for drivers and provides real-time insight of what has been detected so the driver can take the necessary actions.

In one embodiment, the above-mentioned ML based models are trained on a global dataset, but the SDK or the Model Zoo (complementing the SDK) will also contain regional or contextual (e.g., use) models for better edge detection based on regional or contextual nuances. As noted, the models have different parameters that can be tweaked to change confidence thresholds in order to improve accuracy or precision. The embodiments described herein will help the model parameters to be tweaked automatically based on the individual usage of the user using an application created using the SDK. The embodiments describe herein will make use of the different sensors in the device to learn about how the device is mounted, time of day, speed, traffic, etc. to determine which parameter in the model to be tweaked to improve end-user accuracy. The embodiments described herein can also dynamically determine which model to invoke based on the individual driving and usage conditions.

Generally, while object detection models on the edge exist, there is no SDK that incorporates multiple models based on regional differences for the same base functionality. On top of that, the embodiments described herein automatically tweak those model parameters, based on individual usage of the end user, to provide the most accurate detections and alerts based on different usage conditions. The alerts provided to the hazards will be most effective this way.

Figure 2B:
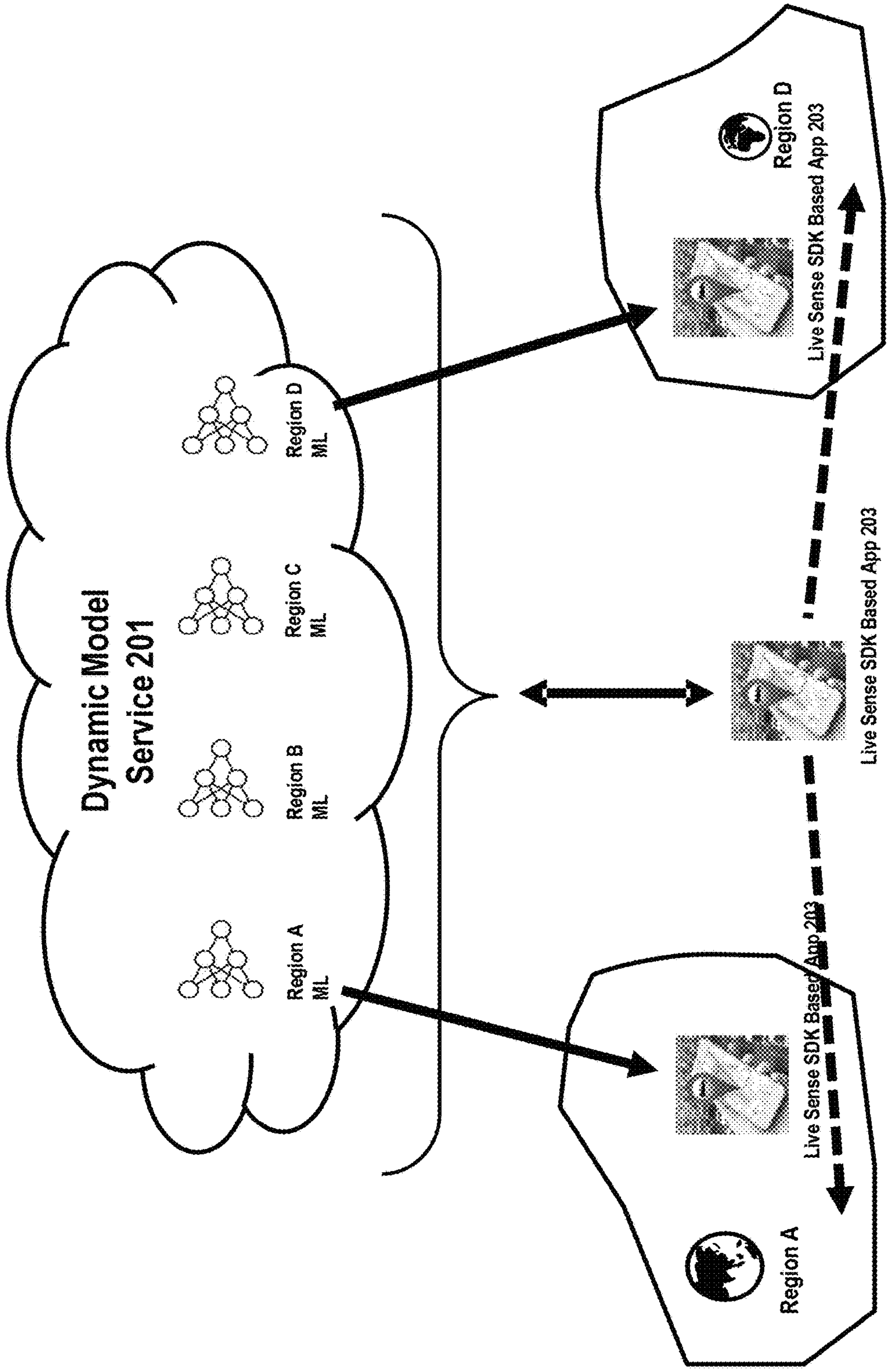
FIG. 2B is a diagram of dynamic model switching, according to one embodiment.

The various embodiments described herein can use location sensors (or other contextual sensors) of the UE 107 to identify the region and/or context, and to dynamically and automatically switch to an optimal regional and/or contextual model (if available for that region and/or context), in order to aid better detection and classification of objects and/or map features (or any other classification category or target). This will enable the end user to always have the best possible model on the device downloaded or enabled automatically based on the location, context, use, etc. for the most accurate detection results, available from the selected model at that time, as compared to using one global model. FIG. 2B is a diagram of dynamic model switching, according to one embodiment. By way of example, the system 100 can provide a dynamic model service 201 such that when a UE 107 loaded with an SDK-based application 203 (e.g., a Live Sense SDK-based application 203) travels among Regions A-D, the system 100 can dynamically switch to corresponding regional ML models A-D based on the location of the UE 107.

In one embodiment, the above-mentioned ML based models can be trained on a global dataset, but the SDK or the Model Zoo 127 (complementing the SDK) can also contain regional and/or contextual (e.g., use) ML models for better edge detection based on regional and/or contextual nuances to be switched dynamically in an application 109 residing in the UE 107. As noted, the embodiments described herein will use the location sensors and/or other contextual sensors of the device to identify the region and/or context and automatically switch the ML model to use the optimal regional and/or contextual ML model (if available for that region/context) to aid better detection and classification. This will enable the end user to always have the best possible ML model on the device downloaded or enabled automatically based on the location for the most accurate detection results, available from the selected ML model at that time, as compared to one global model or manually downloaded/enabled.

In one embodiment, the system 100 initiates at least one drive by a vehicle configured with a sensor system of interest to capture a plurality of images across different regions or contexts. Rather than training a single model for all locations or contexts (e.g., using an aggregate of all collected imagery or training data), the system 100 segregates the training data by region and/or context to separately train regional and/or contextual ML models. In this way, each regional and/or contextual ML model may be better trained to detect objects specific to each respective location or context.

The system 100 can train a plurality of machine learning models (e.g., in the model zoo 127) to detect objects or features in each region and/or context. Objects or features refer to any feature that is photo-identifiable in the image including, but not limited to, physical features on the ground that can be used as possible candidates for survey points.

By way of example, the training can be carried out using a supervised machine learning scheme, such as random forests, support vector machines, or other statistical calculation (including but not limited to averaging, determining a median, determining a minimum/maximum, etc.), etc. Embodiments of the ML zoo solution described herein can be very computationally simple, and easy to implement based on pure geometry. This, in turn, enables the system 100 advantageously reduce the computing resources (e.g., processing power, memory, bandwidth, etc.) used for detecting objected and/or map features. The trained machine learning models can be used to process a plurality of other images to detect objects or features from images.

As shown in FIG. 1, the system 100 includes the mapping platform 103 for providing dynamic model switching and/or model parameters switching (e.g., for object/map feature detection) according to the embodiments described herein. For example, with respect to autonomous, navigation, mapping, and/or other similar applications, the mapping platform 103 can detect road hazards, road furniture, road signs, etc. to facilitate localization, other location-based functions, and/or any other use case relying on object detection, according to the various embodiments described herein. In one embodiment, the machine learning system 119 of the mapping platform 103 includes a Random Forest Classifier or other machine learning system to make predictions from machine learning models. For example, when the input to the machine learning model are images depicting objects or features of interest, the output can include the detected objects (e.g., including bounding boxes or pixel locations of the detected objects).

In other embodiments, the models have different parameters that can be tweaked to change confidence thresholds in order to improve accuracy or precision. The embodiments described herein will help the model parameters to be tweaked automatically based on the individual usage of the user using an application created using the SDK. The embodiments described herein will make use of the different sensors in the device to learn about characteristics such as how the device is mounted, time of day, speed, traffic, etc. to determine which parameter in the model to be tweaked to improve end-user accuracy. The embodiments describe herein can also dynamically determine which model to invoke and/or which model parameters to tweak based on the individual driving and usage conditions. By way of example, the system 100 can provide ML models for object detection/recognition including object classification, identifying objects of interest in an image, and localization by identifying where the object is located in the image.

Figure 2C:
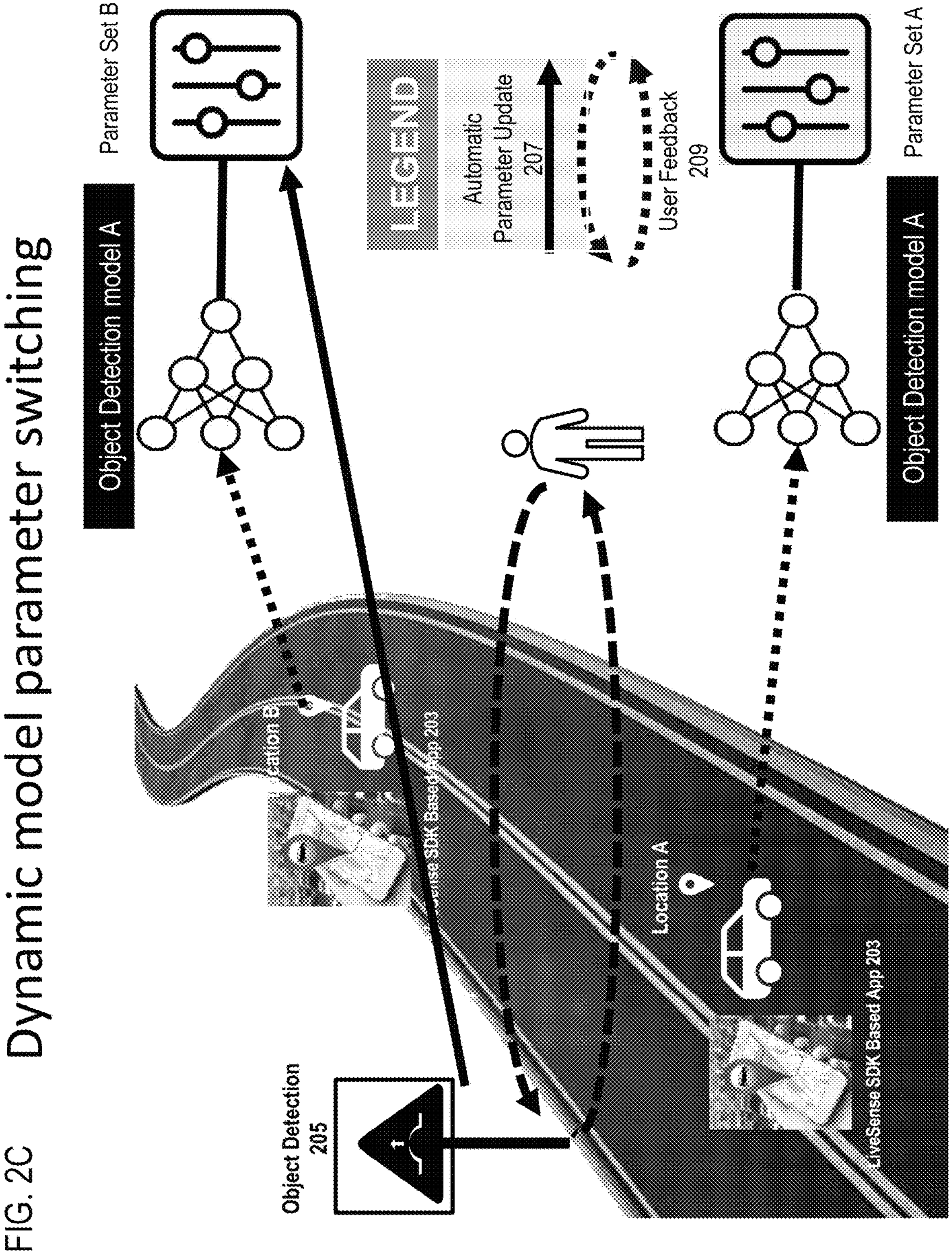
FIG. 2C is a diagram of dynamic model parameter switching, according to one embodiment.

FIG. 2C is a diagram of dynamic model parameter switching, according to one embodiment. By way of example, a UE 107 loaded with an SDK-based application (e.g., a Live Sense SDK-based application 203) travels in Region A from a location A to a location B on a road in FIG. 2C. At Location A, the Live Sense SDK-based application 203 applies an Object Detection Model A using a parameter set A to detect traffic signs on the right side of the road at a confidence threshold of 50%.

When traveling towards Location B, the Live Sense SDK-based application 203 continues applying the Object Detection Model A yet switching to a parameter set B via automatic parameter update 207, in order to detect a traffic sign on the left side of the road (e.g., a speed bump sign 205) at a desired confidence threshold of 50%. The context change of different roadsides may involve changing a mounting configuration of the device within a vehicle. For example, the system 100 can tilt the orientation of a vehicle camera slightly towards left to better capture an image of the speed bump sign 205 and recognize the sign with a confidence threshold of 50%. In one embodiment, the system 100 can verify the object detection using a user feedback 209. In another embodiment, the system 100 can verify the object detection with the data from a geographic database.

In other embodiments, the model parameter switching can be triggered by night (low light), rain, etc., when the vehicle 101 travels from Location A towards Location B.

Although various embodiments are described with respect to object and/or map feature detection, it is contemplated that the approach described herein may be used with object behaviors detection (e.g., driving, braking, walking, running, etc.), etc. In addition to vehicle operation, the embodiments can be applied to delivery drones, warehouse robots, indoor (e.g., POI notifications), underground (e.g., subway operator notifications), etc.

Figure 3:
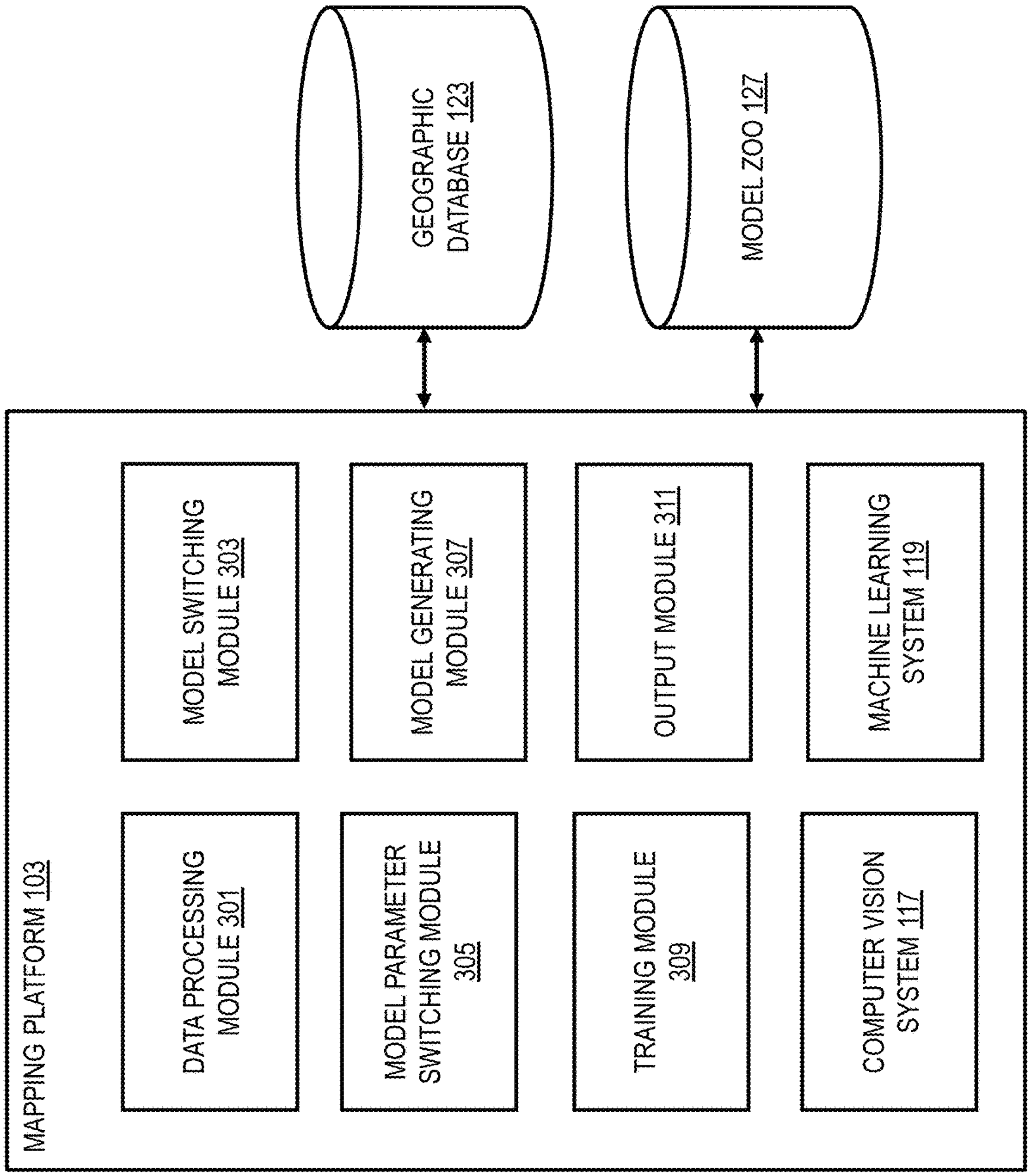
FIG. 3 is a diagram of the components of a mapping platform, according to one embodiment.

FIG. 3 is a diagram of the components of a mapping platform 103, according to one embodiment. By way of example, the mapping platform 103 includes one or more components for providing a dynamic parking and package delivery load recommendation according to the various embodiments described herein. It is contemplated that the functions of these components may be combined or performed by other components of equivalent functionality. In this embodiment, the mapping platform 103 includes a data processing module 301, a model switching module 303, a model parameter switching module 305, a model generating module 307, a training module 309, an output module 311, a computer vision system 117, and a machine learning system 119. The above presented modules and components of the mapping platform 103 can be implemented in hardware, firmware, software, or a combination thereof. Though depicted as a separate entity in FIG. 1, it is contemplated that the mapping platform 103 may be implemented as a module of any of the components of the system 100 (e.g., a component of the vehicle 101, navigation system of the vehicle 101, user equipment (UE) 107, and/or application 109 in UE 107). In another embodiment, one or more of the modules 301-311 may be implemented as a cloud based service, local service, native application, or combination thereof. The functions of these modules are discussed with respect to FIGS. 4-8 below.

Figure 4:
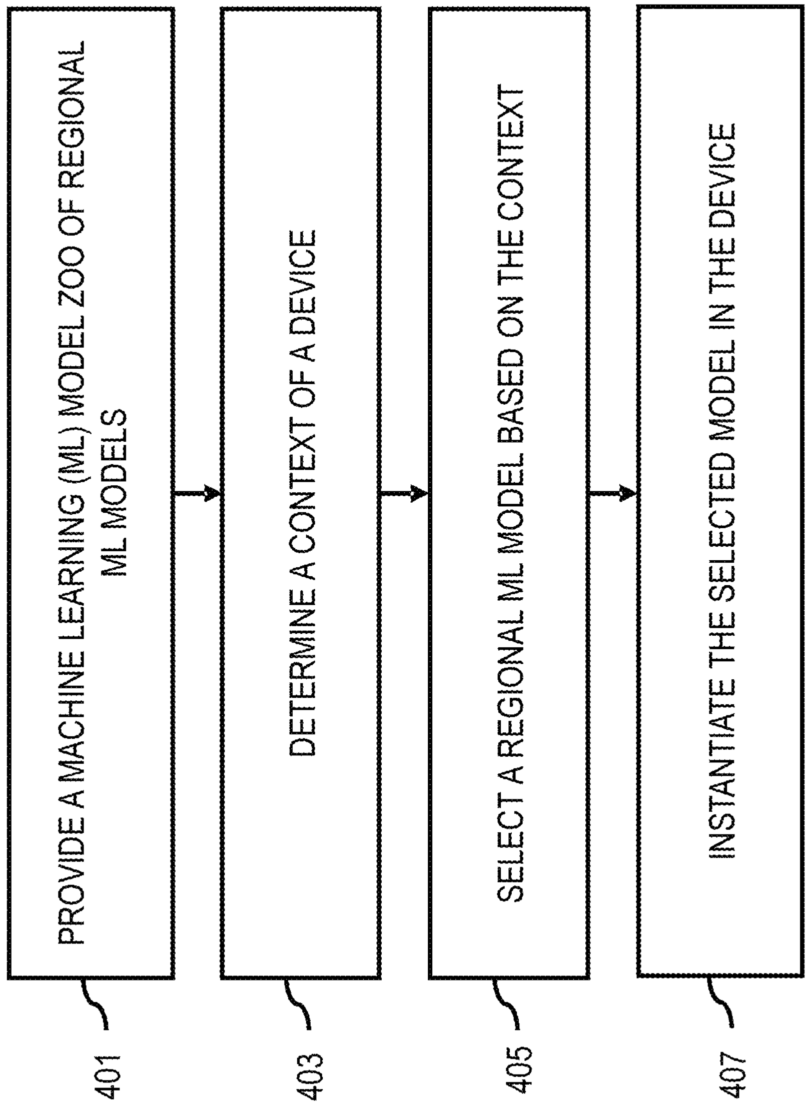
FIG. 4 is a diagram of a process for dynamic model switching, according to one embodiment.
Figure 10:
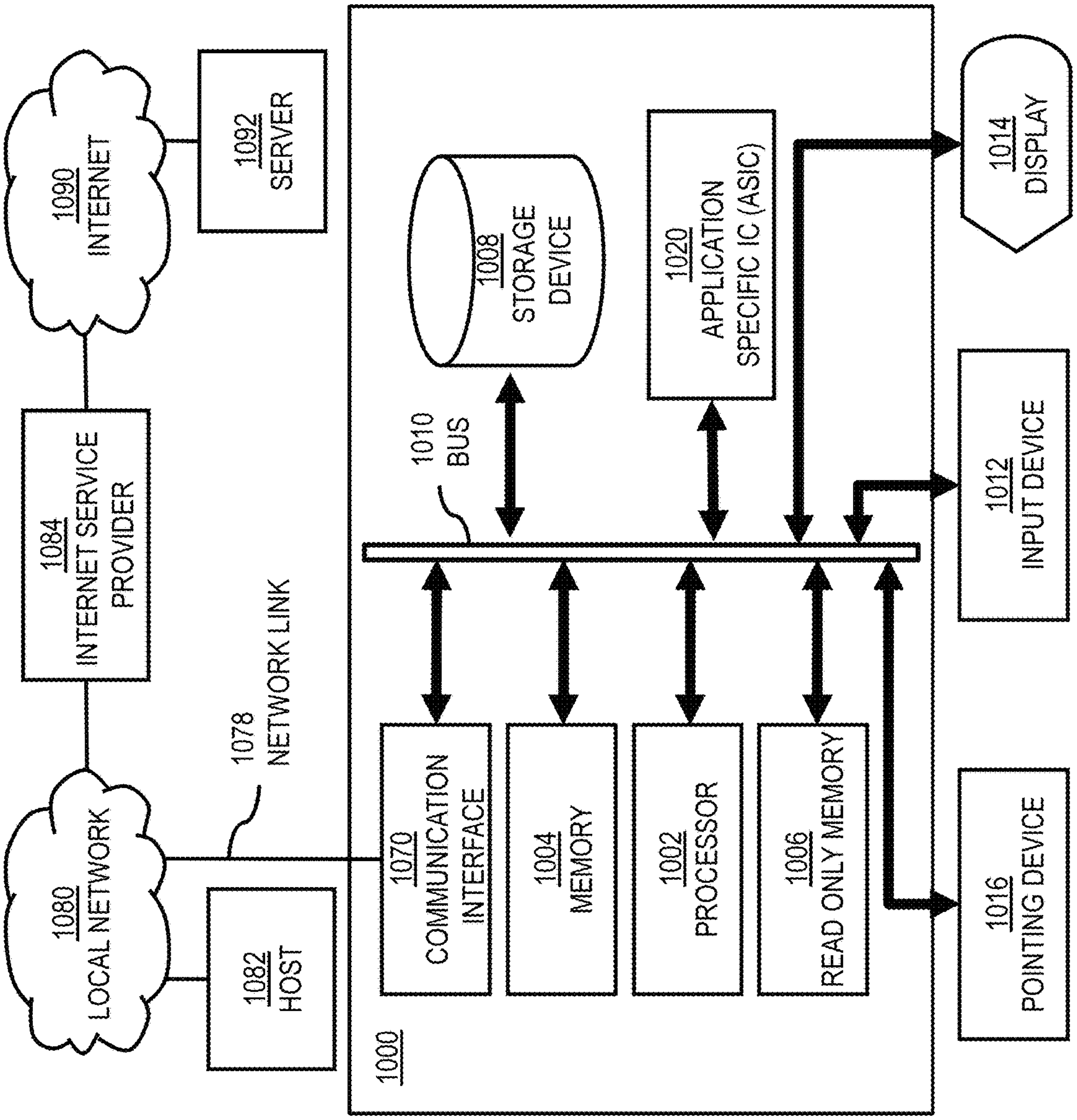
FIG. 10 is a diagram of hardware that can be used to implement an embodiment.

FIG. 4 is a diagram of a process for dynamic model switching, according to one embodiment. In various embodiments, the mapping platform 103 and/or any of the modules 301-311 of the mapping platform 103 as shown in FIG. 3 may perform one or more portions of the process 400 and may be implemented in, for instance, a chip set including a processor and a memory as shown in FIG. 10. As such, the mapping platform 103 and/or any of the modules 301-311 can provide means for accomplishing various parts of the process 400, as well as means for accomplishing embodiments of other processes described herein in conjunction with other components of the system 100. Although the process 400 is illustrated and described as a sequence of steps, its contemplated that various embodiments of the process 400 may be performed in any order or combination and need not include all of the illustrated steps.

In one embodiment, in step 401, the data processing module 301 can provide or import a machine learning model zoo 127 comprising a plurality of regional machine learning models. In one embodiment, the plurality of regional machine learning models provides a common base functionality (e.g., object detection) based on a plurality of respective regional differences.

In one embodiment, the common base functionality includes feature detection (e.g., map features, object features, etc.), feature classification, or a combination thereof based on sensor data collected using one or more sensors (e.g., cameras, microphones, location sensors, etc.) of the device (e.g., UE 107). By way of example, the common base functionality includes road hazard detection, road furniture detection, road sign detection, or a combination thereof. Examples of road hazards may include nails, glass, potholes, other vehicles, cars in an adjacent lane that pull out suddenly, pedestrians partially hidden from view until stepping into a crosswalk, another vehicle that rolls through a stop sign or runs a red light, etc. Examples of road furniture may include roadside objects used for safety and control of traffic, such as road signs, guideposts, safety barriers, light and utility poles, boundary fences, raised road markers, etc.

In one embodiment, the selected regional machine learning model is a feature detection model for detecting one or more features from image data collected by the device (e.g., using the computer vision system 117). In another embodiment, the selected regional machine learning model can apply natural-language processing on audio data (e.g., driver/passenger's talk to passengers, pedestrians, vehicles, etc.) to detect different location-based domains, language, etc. (e.g., using speech, assent, dialogs recognition), in order to determine a context (e.g., a region).

In one embodiment, in step 403, the data processing module 301 can determine a context of a device. In one embodiment, the device is a mobile edge device capable of moving between a plurality of geographic regions. For example, the device (e.g., UE 107) can be a vehicle (e.g., vehicle 101) or can be associated with the vehicle, and the common base functionality can include an autonomous operation of the vehicle 101.

In one embodiment, in step 405, the model switching module 303 can select a regional machine learning model from the plurality of regional machine learning models based on the context. For example, the context includes a geographic location of the device.

In one embodiment, in step 407, the model switching module 303 can instantiate the selected regional machine learning model in the device.

The regional models can go into more granular regions than countries, such as cities, towns, points of interest (POIs), sub-POIs within a POI, etc. that have road furniture, road hazards, driving behaviors, etc. different from region to region. In one embodiment, the system 100 can provide a plurality of machine learning models trained to detect one or more object attributes within a point of interest (POI), process sensor data to determine at least one context, at least one use of the one or more object attributes (product shelves, products, checkout counters, etc.), or a combination thereof, select at least one machine learning model of the plurality of machine learning models based on the at least one context that includes a type of the POI (e.g., restaurant, supermarket, hardware store, etc.), and provide the selected at least one machine learning model to detect the one or more object attributes. By way of example, the one or more object attributes include one or more walking path/aisle attributes, one or more walking hazards, or a combination thereof. The one or more path attributes, the one or more walking hazards, or a combination thereof are different from POI to POI. Each type of POIs has its own set of objects (e.g., clothing store, hardware store, etc.), and the respective regional model can be tuned to recognize different types objects, or arrangements of different ways (e.g., different shelf arrangements and/or spacing).

In addition, different types of POIs can have different contextual parameters that can affect the quality of images or other sensor data captured at or depicting the POIs, such as bright lighting in a library or school, and darker lighting in a restaurant. In one embodiment, the system, 100 can extract the sensor data from one or more sensors in a user device (e.g. UE 107) travelling near or in the POI, and the one or more sensors can include at least one camera, at one light sensor, etc. A POI model may be selected by on a location/region, and/or other contextual parameters (more details will be discussed in conjunction with FIG. 5).

In one embodiment, the device is a mobile edge device capable of moving between a plurality of geographic regions. The context is determined dynamically, and the regional machine learning model is selected dynamically as the device moves across the regions. In one embodiment, the selected regional machine learning model is downloaded to the device. By way of example, the device can process sensor data to determine at least one context. The device then can cause, at least in part, a transmission of the at least one context to a server (e.g., the mapping platform 103) that provides a plurality of machine learning models trained to detect one or more road attributes. After the transmission, the device can receive from the server at least one machine learning model of the plurality of machine learning models based on the at least one context. The device can provide the at least one machine learning model to detect the one or more road attributes.

In another embodiment, the selected regional machine learning model is pre-loaded and enabled at the device on demand. Different zoom/granular levels of a region will affect the frequency of regional model switching thus an amount of dynamical download models and/or pre-load models in the device. By way of example, the device may change model by city block in Chicago as the device moves across map tiles.

A region-specific ML model selected from the model zoo 127 provides more accurate object recognition for the region, improves driving assistance via real-time driver alerts of detected objects. In one embodiment, the model zoo 127 is included in a software development kit (SDK) used for compiling an application package for execution by the device. The details of the SDK are discussed with respect to FIGS. 6A-6C below. The SDK can incorporate multiple models based on regional differences for the same base functionality. On top of that, the system 100 automatically invokes the region-specific model based on a device location. A machine learning model, for instance, is an algorithm that accepts relevant data to identify patterns in the input data (e.g., image data) to determine correlations to output data (e.g., objects detected in the image data). Examples of machine learning models that can be used according to the embodiments described herein include but are not limited to convolutional neural networks, recurrent neural networks, support vector machines, decision trees, and/or equivalent.

Figure 5:
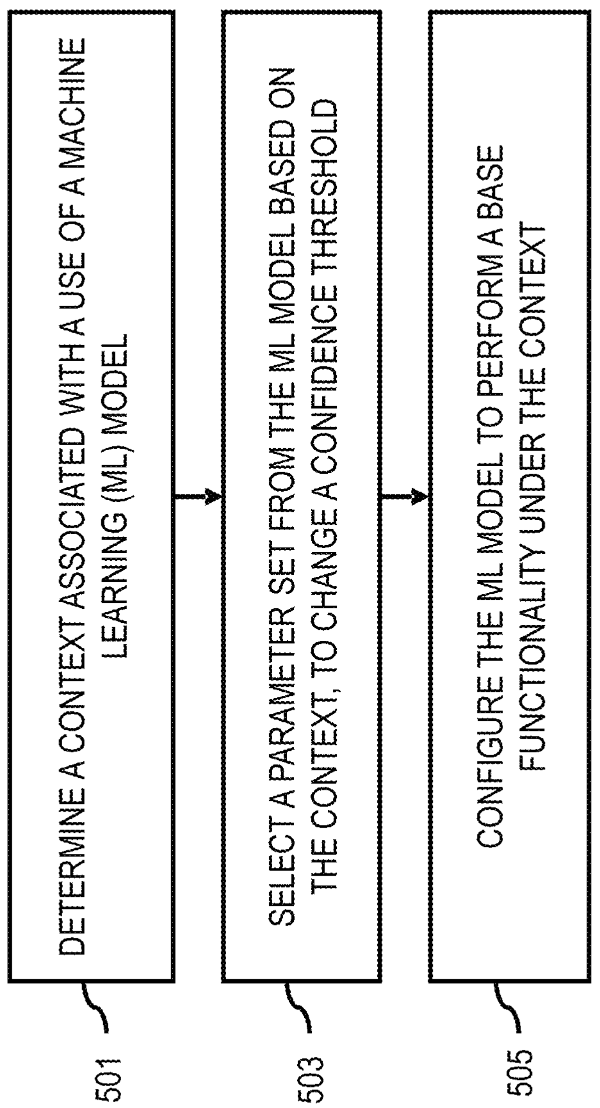
FIG. 5 is a diagram of a process for dynamic model parameter switching, according to one embodiment.

FIG. 5 is a diagram of a process for dynamic model parameter switching, according to one embodiment. In various embodiments, the mapping platform 103 and/or any of the modules 301-311 of the mapping platform 103 as shown in FIG. 3 may perform one or more portions of the process 500 and may be implemented in, for instance, a chip set including a processor and a memory as shown in FIG. 10. As such, the mapping platform 103 and/or any of the modules 301-311 can provide means for accomplishing various parts of the process 500, as well as means for accomplishing embodiments of other processes described herein in conjunction with other components of the system 100. Although the process 500 is illustrated and described as a sequence of steps, its contemplated that various embodiments of the process 500 may be performed in any order or combination and need not include all of the illustrated steps.

In one embodiment, in step 501, the data processing module 301 can determine a context associated with a use of a machine learning model at a device (e.g., UE 107). In one embodiment, the data processing module 301 can process sensor data collected from one or more sensors of the device to determine the context.

In one embodiment, the machine learning model uses image data captured by a camera sensor of the device as an input to perform a base functionality (e.g., object detection). By way of example, the context includes a mounting configuration of the device (e.g., UE 107) within a vehicle (e.g., vehicle 101) as in FIG. 2C, e.g., tilting the orientation of a vehicle camera slightly towards left to better capture an image of the speed bump sign 205 and recognize the sign with a confidence threshold of 50%. Other example device mounting parameters may include camera settings (viewer width/height, location, orientation, etc.), image parameters (time stamps, sequence values, frame rotation/luminance), etc.

In one embodiment, in step 503, the model parameter switching module 305 can select a parameter set from a plurality of parameter sets associated with the machine learning model based on the context, and the plurality of parameters sets specify a plurality of respective parameter values to change at least one confidence threshold of the machine learning model.

In one embodiment, the plurality of parameter sets includes a connection weight parameter, a bias value, an activation function, etc. of a neural network. A neural network machine learning model has a series of nodes/neurons, and within each node is a set of inputs X1-Xn, connection weights W1-Wn, a bias value, and activation function. A connection weight W decides how much influence the respective input X will have on the output. In a neural network, an activation function of a node defines the output of that node given an input or set of inputs. The weights can increase the steepness of the activation function, and decide how fast the activation function will trigger; whereas the bias value can delay the triggering of the activation function. By tweaking the connection weight parameter, the bias value, and/or an activation function, the model parameter switching module 305 can change at least one confidence threshold of the output of the neural network.

In another embodiment, the model parameter switching module 305 can tweak a model hyperparameter (e.g., a topology and size of a neural network) referring to the model selection task, or an algorithm hyperparameter (e.g., a learning rate, a mini-batch size, etc.) that has no influence on the performance of the model but affects the speed and quality of the learning process.

As other examples, the context includes a time of day (e.g., morning, noon, afternoon, evening, light conditions, etc.), a speed, a traffic condition (e.g., free flow, delays, accidents, traffic jams, constructions, closures, etc.), or a combination thereof. For instance, a change from day (high light) to night (low light) can trigger model parameter switching.

In another embodiment, the device is a vehicle or is a component associated with the vehicle, and the context includes a driving condition of the vehicle (e.g., speed, model, tire conditions, brake conditions, gas tank conditions, a traveled distance, a traveled time, manually driving, one of the six levels of autonomous driving, etc.), a characteristic of an object of interest, weather, a road type, road conditions, etc. at the use of the machine learning model. The Society of Automotive Engineers International defines driving automation are six levels: Level 0 (automated system has no sustained vehicle control), Level 1 ("hands on"), Level 2 ("hands off"), Level 3 ("eyes off"), Level 4 ("mind off"), and Level 5 ("steering wheel optional").

By way of example, police cars and fire trucks have different features that can trigger model parameter switching. As another example, the object of interest is a person, and walking behavior(s) of a young person versus an older person (e.g., walking slower on street and/or with a cane) may trigger model parameter switching.

In another embodiment, the context is a user feedback or situation awareness/calibration which can trigger model parameter switching. Referring back to FIG. 2C, when the user feedback indicates that there is a loose black plastic cover hanging under the speed bump sign 205, the model parameter switching module 305 can trigger model parameter switching to consider a loose traffic sign cover.

In yet another embodiment, the context is a geographic location, and the plurality of different respective parameter values is generated for a plurality of geographic locations. By way of example, the geographic locations include a residential area, a commercial area, an industrial area, etc. within a city. As another example, the geographic locations include an exhibition hall, a casino, a garden, a golf course, a farm, a poll/beach, a restaurant area, a hotel area, etc. within a resort.

In various embodiments, the parameter set is selected to achieve a target accuracy, a target precision, or a combination thereof of the machine learning model under the determined context.

In one embodiment, the machine learning model is preloaded and enabled at the device on demand. In another embodiment, the machine learning model is downloaded to the device. By way of example, the device can process sensor data to determine data of at least one characteristic of a camera, a vehicle on which the camera is mounted, an environment in which the camera is operated, or a combination thereof. The device then can cause, at least in part, a transmission of the data to a server (e.g., the mapping platform 103). After the transmission, the device can receive from the server at least one model parameter of a machine learning model, wherein that at least one model parameter is changed based on the least one characteristic. The device can automatically change the at least one model parameter of the machine learning model, and provide the machine learning model with the at least one model parameter for object detection. In another embodiment, the machine learning model and the plurality of parameter sets are included in a software development kit (SDK) used for compiling an application package for execution by the device. The details of the SDK are discussed with respect to FIGS. 6A-6C below.

In one embodiment, in step 505, the model parameter switching module 305 can configure the machine learning model based on the selected parameter set to perform a base functionality under the determined context. By way of examples, the based functionality includes road hazard detection, road furniture detection, road sign detection, or a combination thereof.

In one embodiment, during a user application development process, the system 100 can provide an application developer a user interface to interact with the ML models in the model zoo 127 (e.g., for object detection). For example, the model zoo can include different models trained to detect different object classes. In some cases, not all object classes may be applicable to all areas or regions. Accordingly, the system 100 can provide the model zoo from which one or more models can be dynamically selected and instantiated on an edge device depending on its context (e.g., location). In one embodiment, as part of this location-based dynamic model selection, the system 100 can configure the confidence values of the models as well as the individual classes (e.g., neighboring car, pedestrian, bicycle, motorcycle, truck, etc.) within each model (e.g., a Road Basics Model). For instance, the application developer can select the Road Basics Model for a car in Table 1 that identifies a vehicle in an image and provides a bounding box of where the vehicle was identified.

Table 1 shows different model categories, names, respective detection object classes, and recommended confidence values as follows. Each model can have a set of object classes to detect. For example, the Road Basics Model in Table 1 can detect road basic object classes such as pedestrian, bicycle, car, motorcycle, truck, traffic-light, stop-sign, etc. It can be up to the application developer to determine which object(s) to detect, which models are relevant to applicable use case(s), and/or which model parameter(s) to tweak to reach specific confidence values. Using a lower confidence threshold will result in more object detections, yet an overall lower detection accuracy, i.e., more false positives. A detected object can be described based on the following properties: (1) class—what object was detected, (2) location—Where the object was found in the image frame, and a confidence score—A number between 0 and 1 that indicates confidence that the object was correctly detected. Therefore, the system 100 can recommend user application developers to develop applications with a confidence threshold at or above 60% to maintain a reasonably accurate output.

TABLE 1

| Category | Model Name | Class Label | Recommended Confidence |
|---|---|---|---|
| Road Basics | Road Basics Model | pedestrian | 45 |
| | | bicycle | 50 |
| | | car | 50 |
| | | motorcycle | 50 |
| | | truck | 50 |
| | | traffic-light | 50 |
| | | stop-sign | 50 |
| Road Alerts | Road Alerts Model | brake-light-on | 80 |
| | Traffic Light Model | green | 75 |
| | | red | 75 |
| | | yellow | 75 |
| Road Hazards | Cone Barrier Model | cone | 60 |
| | | strip-stand | 60 |
| | | cylindrical-barrier | 60 |
| | | delineator-barrier | 60 |
| | Pothole Model | pothole | 80 |
| | Signage Model | roadworks-going-on | 60 |
| | | road-closed | 55 |
| | Speed Bump Model | speedbump | 55 |
| | Bridge Tunnel Model | bridge | 75 |
| | | tunnel | 75 |
| | Height Restriction Signs Model | height-restriction-sign | 60 |
| Road Signs | Road Signs Model | maximum-speed-limit-[5-130] | 60 |
| . . . | | | |

In one embodiment, the model generating module 307 can generate the plurality of regional machine learning modules using a plurality of different machine learning model architectures to provide for the plurality of respective regional differences.

In one embodiment, the model training module 309 can initiate a training of the plurality of regional machine learning models using a plurality of respective regional datasets to provide for the plurality of respective regional differences. In another embodiment, the model training module 309 can initiate a training of a machine learning model based on one or more user feedbacks, the sensor data, map data, or a combination thereof, after tweaking and applying the model parameter set. In yet another embodiment, the model training module 309 can perform periodically update of the ML models, the model zoo 127, Table 1, or a combination thereof (e.g., new models, update classes, add new features, etc.), such that the output module 311 can automatically push updates to UE 107.

In one embodiment, the training module 309 in connection with the machine learning system 119 selects model parameter(s) such as device mount settings, camera settings, a time of day, a speed, traffic transport modes, traffic patterns, road topology, driving behaviors, etc., to tweak and change confidence thresholds in order to improve accuracy or precision. In one embodiment, the training module 309 can train the machine learning system 119 to select or assign respective weights, correlations, relationships, etc. among the factors, to determine optimal model parameter(s) for adjustment for different scenarios. In one instance, the training module 309 can continuously provide and/or update a machine learning model (e.g., a support vector machine (SVM), neural network, decision tree, etc.) of the machine learning system 119 during training using, for instance, supervised deep convolution networks or equivalents. In other words, the training module 309 trains the machine learning model using the respective weights of the factors to most efficiently select optimal model parameter(s) for adjustment for different scenarios in different regions.

In another embodiment, the machine learning system 119 of the mapping platform 103 includes a neural network or other machine learning system to compare (e.g., iteratively) vehicle paths features and/or enhanced vehicle path features (e.g., using distance/width/length thresholds, offsets, etc.) to detect objects (e.g., other vehicles, pedestrians, traffic signs, etc.) on the roads. In one embodiment, a neural network of the machine learning system 119 is a traditional convolutional neural network which consists of multiple layers of collections of one or more neurons (which are configured to process a portion of an input data). In one embodiment, the machine learning system 119 also has connectivity or access over the communication network 109 to the model zoo 127 and/or the geographic database 123 that can each store probe data, labeled or marked features (e.g., historically expected volumes and/or real-time actual observed volumes on road segments), etc.

In one embodiment, the training module 309 can improve the dynamic model switching and/or model parameter switching using feedback loops based on, for example, user behavior and/or feedback data. In one embodiment, the training module 309 can improve a machine learning model for the dynamic model switching and/or model parameter switching using user behavior and/or feedback data as training data. For example, the training module 309 can analyze correctly detected object data, missed object data, etc. to determine the performance of the machine learning model.

A software development kit (SDK) is a collection of software development tools in one installable package. An SDK can ease creation of applications by having a compiler, a debugger, and optionally a software framework. In one embodiment, the SDK is designed to give drivers real-time insight in order to make informed decisions on upcoming obstacles, road infrastructure, and/or driving conditions, with or without cloud processing or connectivity. Through the model zoo 127, the SDK turns devices with front-facing cameras, such as smartphones, dashcams, and/or vehicle cameras, etc., into object detection sensors. By continuously scanning the vehicle's environment, devices can detect objects on the road, such as other vehicles, pedestrians, bicycles, road infrastructure (e.g., traffic lights, road signs, etc.), and potential hazards (e.g., potholes, road closures, construction zones, etc.).

For example, a user application developer wants to develop a ride sharing application to alert the passengers of an estimated time to collision. This feature not only helps an autonomous vehicle to avoid accidents and ensure driver safety, but also mentally prepares the passengers for a possible collision. For example, the ride sharing application can calculate a distance between each object detection and the point of view and send an alert when the distance goes beyond a specified alert distance. The SDK is provided as a ready-to-use library/model zoo 127 for developing the ride sharing application. The basic use of the SDK 601 includes the detection of cars, pedestrians, signs, and other supported objects in a still image or live video, such as the models listed in Table 1.

Figure 6A:
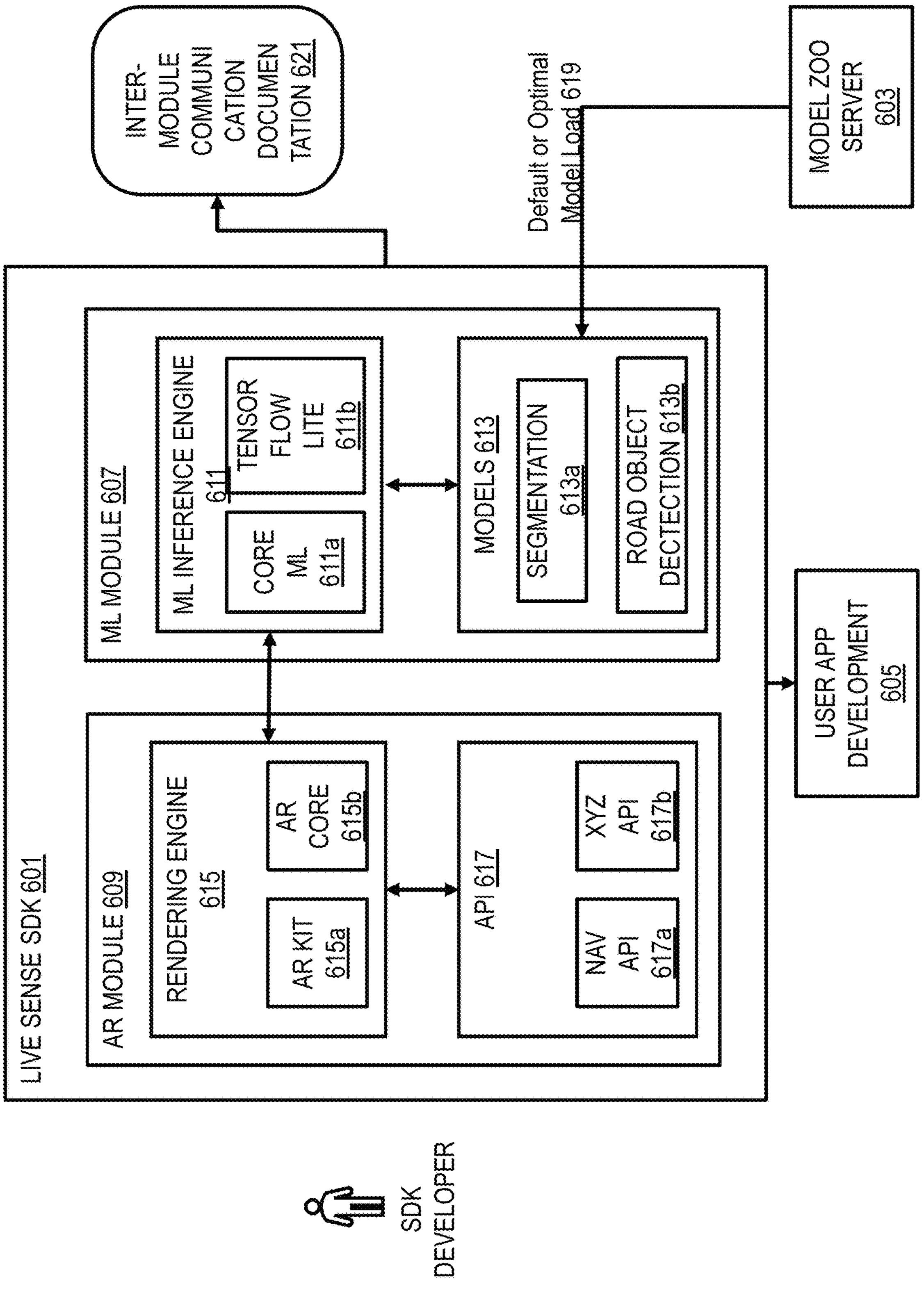
FIG. 6A is a diagram of an example software development kit, according to one embodiment.

FIG. 6A is a diagram of an example software development kit (e.g., Live Sense SDK 601), according to one embodiment. In FIG. 6A, a SDK developer can develop the Live Sense SDK 601 to interact with an example model zoo server 603, to support a user application development environment 605. In one embodiment, the Live Sense SDK 601 includes an ML module 607 and an augmented reality (AR) module 609. The ML module 607 includes a ML inference engine 611 and a plurality of ML models 613. The AR module 609 includes a rendering engine 615 and an application programming interface (API) 617.

For instance, the user application developer can create an application class and initialize the ML inference engine 611 in the ride sharing application. The ML inference engine 611 can apply logical rules to the knowledge base to deduce the default or optimal ML model(s) 613 among a core ML 611*a* and TensorFlow Lite 611*b* for the ride-sharing application.

TensorFlow is a free and open-source software library for dataflow and differentiable programming across a range of tasks. It is a symbolic math library, and is also used for machine learning applications such as neural networks. It uses data flow graphs to build models, and allows developers to create large-scale neural networks with many layers. TensorFlow is mainly used for: Classification, Perception, Understanding, Discovering, Prediction and Creation.

The ride-sharing application can be set to load the default or optimal ML model(s) 613 via a process 619 for image segmentation 613*a* and road object detection 613*b*. In one embodiment, an optimal ML model is set to be loaded from the model zoo server 603, when the application developer activates automatic model switching. In another embodiment, the default ML model is set to be loaded from the model zoo server 603, when the application developer manually selects the default ML model, or fails to activate automatic model switching. The above-discussed operations for the ride sharing application to interact with the SDK 601 and the model zoo server 603 are specified in an inter-module communication documentation 621.

In addition, the ride-sharing application can be set to feed the output of the ML module 607 to a rendering engine 615 of the AR module 609 to argument an alert of a detected object onto the live image captured by a camera. In particular, an AR kit 615*a* and a AR core 615*b* of the rendering engine 615 can execute the augmenting functions, and generate data for presentation on a user interface. The data for presentation is set to be forwarded to an application programming interface (API) 617 of the AR module 609, for an Navigation API 617*a* and an XYZ API 617*b* for processing in the user application development environment 605 (so the developer can set the ride-sharing application to interact with the AR module 609 via the APIs 617*a*, 617*b*).

The XYZ API 617*b* can be a real-time cloud-based location hub for discovering, storing, retrieving, manipulating, and publishing private or public mapping data. The XYZ API 617*b* can use the concepts of Spaces to store data for the ride-sharing application. A Space is the ride-sharing application's own geospatial data repository, which the ride-sharing application can quickly create when needed to store data. The ride-sharing application can interact with the XYZ API directly with public REST APIs that are simple and straightforward to use from any application environment by make RESTful requests. Representational state transfer (REST) is a software architectural style that defines a set of constraints to be used for creating web services.

In one embodiment, a ML model can be both initialized and executed on the same thread. In another embodiment, the same ML model can be both initialized and executed on multiple threads yet to prepare for unexpected behaviors. Different ML models may be executed in parallel, yet each model instance preferably handles one image at a time. Executing a model before completing the previous call may result in an exception.

Figure 6B:
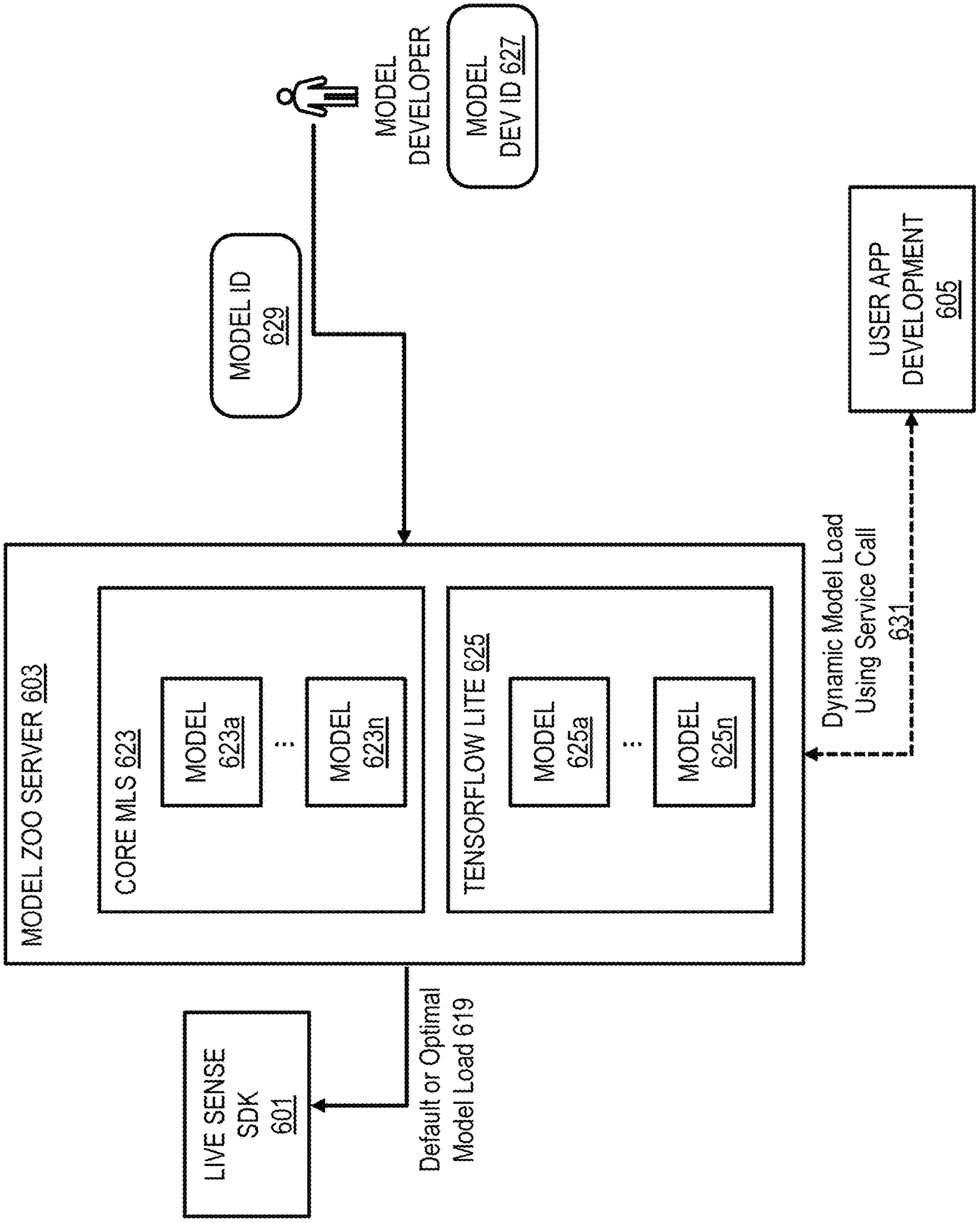
FIG. 6B is a diagram of an example model zoo server, according to one embodiment.

FIG. 6B is a diagram of an example model zoo server, according to one embodiment. In one embodiment, the model zoo server 603 can store core ML models 623*a*-623*n* and TensorFlow Lite models 625*a*-625*n*. The TensorFlow Lite models 625*a*-625*n* can be stored in a Model Garden for TensorFlow, that is a repository with a number of different implementations of state-of-the-art (SOTA) models and modeling solutions for TensorFlow users. To create a new core or TensorFlow ML model for the model zoo server 603, a model developer can click to generate a Model Dev ID 627 and an model ID 629. After setting up the inter-module communication documentation 621 for the ride-sharing application, the ride-sharing application can trigger the dynamic model load using a service call 631 into the user application development environment 605. The above-discussed operations for the ride sharing application to interact with the SDK 601 are specified in an SDK documentation 645.

In one embodiment, TFLite is the default engine and can run on most device meeting the minimum requirements. In another embodiment, the SDK further includes a Snapdragon Neural Processing Engine (SNPE) that is a Qualcomm Snapdragon software accelerated runtime for the execution of deep neural networks. Each Engine may have multiple runtimes available. If none are specified, then the SDK 601 will select the best runtime available for the current Engine.

To provide better detections, some models allow selection of a region. If the desired region is supported, an ML model better tuned for that region (e.g., Oceania, Southeast Asia, Brazil, etc.) will be used in place of a default/global ML model.

Figure 6C:
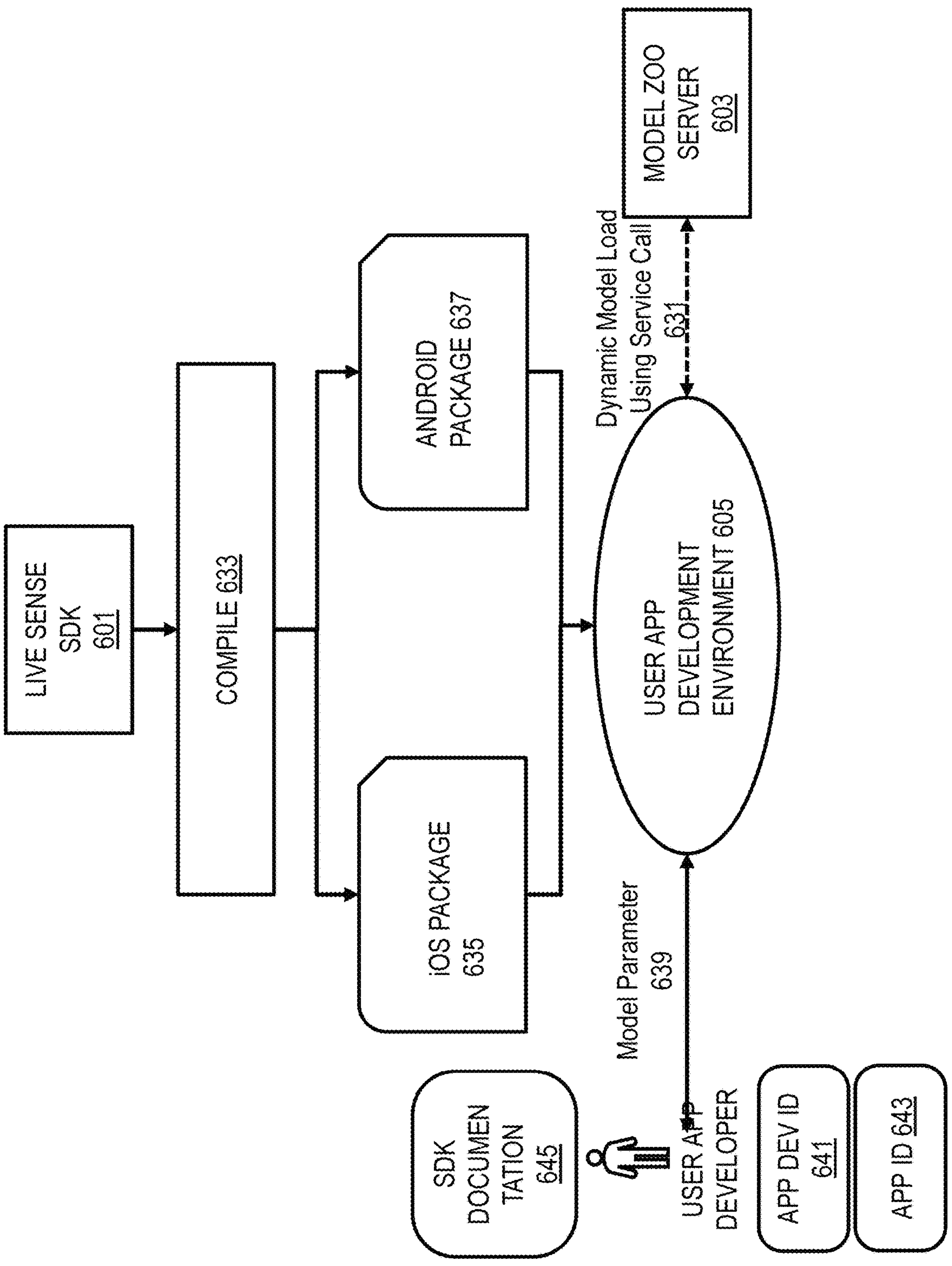
FIG. 6C is a diagram of an example user application development environment, according to one embodiment.

FIG. 6C is a diagram of an example user application development environment, according to one embodiment. To obtain the SDK 601, the a user application developer can navigate to an iOS package 635 or an Android package 637, and click to generate an App Dev ID 641 and an App ID 643, to obtain app credentials and the SDK download link. The application developer can follow the link to download the SDK module and examples as a Zip package.

To add the SDK 601 to a project (e.g., the ride sharing application), a user application developer can follow these steps: (1) Create/open a phone/tablet application project, (2) set a minimum API Level (e.g., 24 or greater), and (3) add the SDK module to the project.

In one embodiment, the output from the SDK 601 is compiled in process 633 to generate the iOS package 635 and the Android package 637, to provide the user application development environment 605 for the user application developer. The user application developer can develop the ride-sharing application that takes advantage of the SDK 601 and the model zoo server 603 by setting the dynamic model load using a service call 631, based on dynamic model switching (based on a region/location) and/or dynamic model parameter switching (based on at least one model parameter 639).

Figure 7:
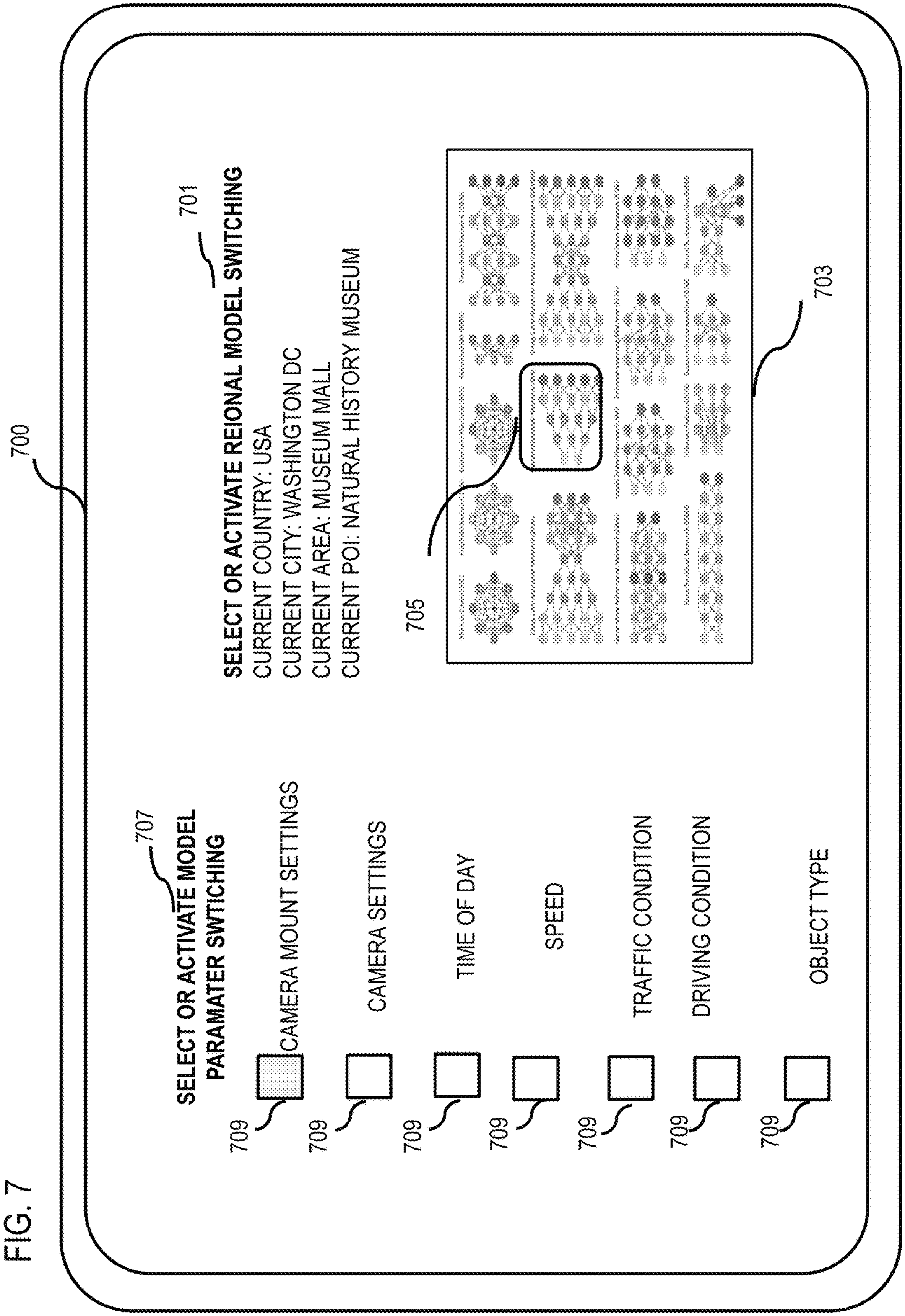
FIG. 7 is a diagram of an example user application developer interface, according to one embodiment.

FIG. 7 is a diagram of an example application developer interface 700, according to one embodiment. The application developer interface 700 shows a prompt 701 to the application developer to select a ML model or to activate an automatic model switching at a zoom level in the model zoo 703: e.g., for the current county USA, the current city: Washington D.C., the current area: Museum Mall, the current POI: the Natural History Museum. If the application developer decides to select manually, the interface 700 highlights a selected model 705 (e.g., a neural network). In addition, the interface 700 shows a prompt 707 to the application developer to select a ML parameter 709 (e.g., camera mount settings) or to activate an automatic model parameter switching.

In one embodiment, the output module 311 can cause at least one notification (audio and/or visual) via a user interface in the vehicle 101. By way of example, the at least one notification includes one or more detected road objects, one or more driving maneuvers in response to the one or more detected road objects, or a combination thereof.

Figure 8:
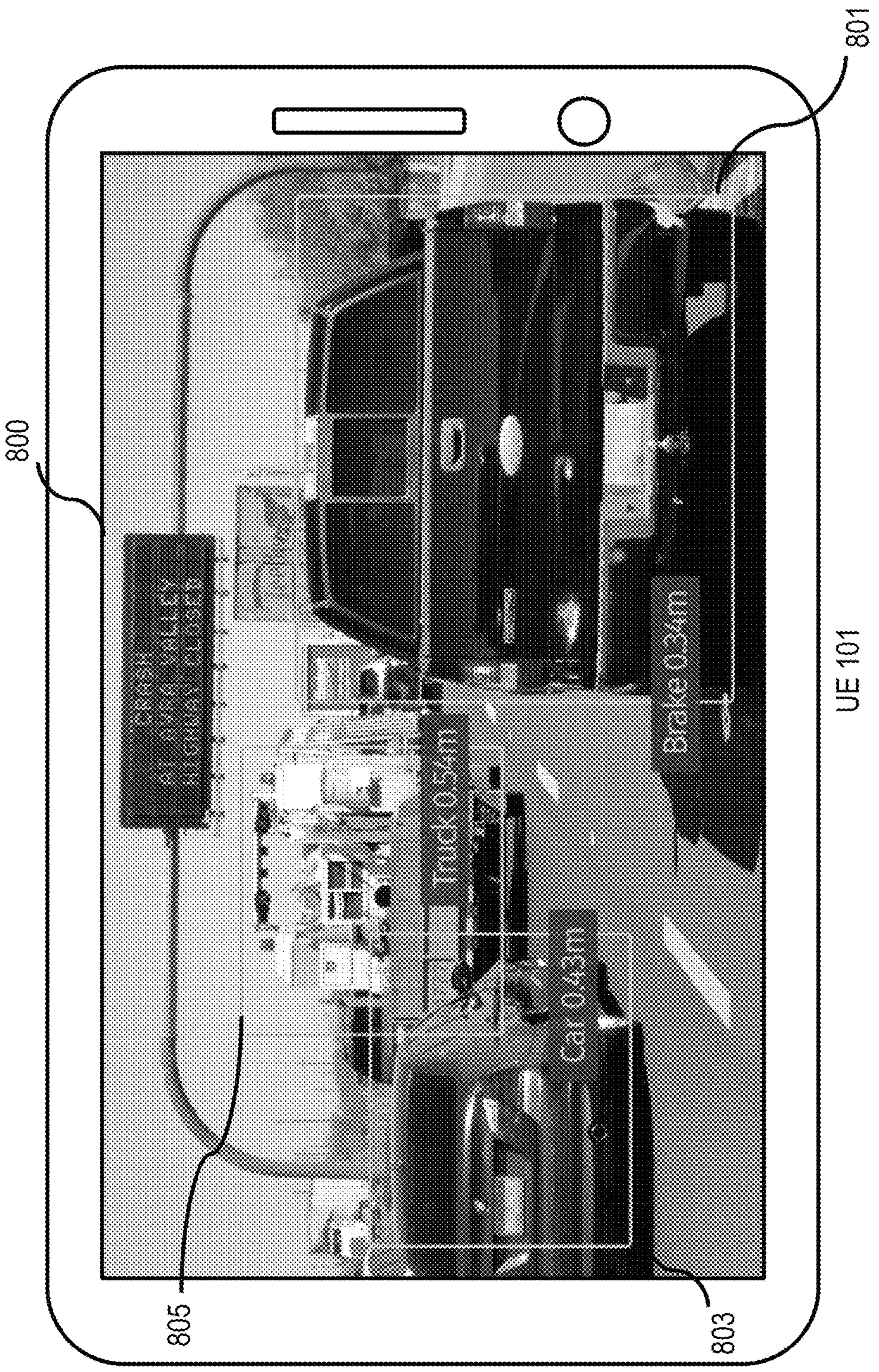
FIG. 8 is a diagram of an example navigation user interface, according to one embodiment.

In another embodiment, the output module 311 can cause at least one visual presentation via a user interface in the vehicle 101. By way of example, the visual presentation continuously identifies each of the one or more road objects in a bounding box. FIG. 8 is a diagram of an example navigation user interface (UI) 800, according to one embodiment. The UI 800 continuously shows a bounding box 801 of a truck 0.34 meter away applying a brake, a bounding box 803 of a car 0.43 meter away, and a bounding box 805 of a construction truck 0.54 meter away.

In another embodiment, the output module 311 can cause at least one autonomous maneuver by the vehicle 101 in response to the detected one or more road objects, such as a neighboring vehicle, a pedestrian, a bicycle, a vehicle brake, a pothole, a construction zone, a traffic light, a speed limit, etc.

In another embodiment, the output module 311 can automatically push updates of the ML models, the model zoo 127, Table 1, etc., to UE 107, for example, to add night/low light features, a raining model to detect road signs and lines, etc.

The above-discussed embodiments utilize a machine learning model zoo that is a part of the SDK. The SDK contains multiple ML-based models for various attributes like road hazard detection, road furniture detection, road signs classification and detection, etc. The model zoo contains regional models for better edge detection based on regional nuances. An application developed based on the SDK enables a vehicle driver to detect various road objects and/or features/attributes, be alerted of and avoid any hazards on the road based on a regional model.

In addition, the above-discussed embodiments can also dynamically determine which model to invoke based on the individual driving and usage conditions. Each of the models have different parameters that can be automatically tweaked to change confidence thresholds in order to improve accuracy or precision based on the individual usage by the user via an application created using the SDK. The above-discussed embodiments make use of different sensors in the device to learn context such as how the device is mounted, a time of day, a speed, a traffic condition, etc. to determine which parameter in the model to be tweaked to improve accuracy for the end-users.

Referring back to FIG. 1, the machine learning system 119 and/or the computer vision system 117 also have connectivity or access over a communication network 121 to a geographic database 123 which stores the imagery for different sources (e.g., with different views or perspectives), extracted features, features correspondences, quality of sensor system pose data, derived maps, etc. generated according to the embodiments described herein. In one embodiment, the geographic database 123 includes representations of features and/or other related geographic features determined from feature correspondences to facilitate visual odometry to increase localization accuracy.

In one embodiment, the machine mapping platform 103 has connectivity over a communication network 121 to the services platform 113 that provides one or more services

115*a*-115*n*. By way of example, the services 115 may be third party services and include mapping services, navigation services, travel planning services, notification services, social networking services, content (e.g., audio, video, images, etc.) provisioning services, application services, storage services, contextual information determination services, location-based services, information based services (e.g., weather, news, etc.), etc. In one embodiment, the services 115 uses the output of the mapping platform 103 (e.g., location corrected images, features, etc.) to localize the vehicle 101 or UE 107 (e.g., a portable navigation device, smartphone, portable computer, tablet, etc.) and/or provide services 115 such as navigation, mapping, other location-based services, etc.

In one embodiment, the mapping platform 103 may be a platform with multiple interconnected components. The mapping platform 103 may include multiple servers, intelligent networking devices, computing devices, components, and corresponding software for providing parametric representations of lane lines. In addition, it is noted that the mapping platform 103 may be a separate entity of the system 100, a part of the one or more services 115, a part of the services platform 113, or included within the UE 107 and/or vehicle 101.

In one embodiment, content providers 125*a*-125*m* (collectively referred to as content providers 125) may provide content or data (e.g., including geographic data, parametric representations of mapped features, etc.) to the geographic database 123, the mapping platform 103, the services platform 113, the services 115, the UE 107, the vehicle 101, and/or an application 109 executing on the UE 107. The content provided may be any type of content, such as map content, textual content, audio content, video content, image content, etc. In one embodiment, the content providers 125 may provide content that may aid in the detecting and classifying of objects and/or map features in image data based on dynamic model switching. In one embodiment, the content providers 125 may also store content associated with the geographic database 123, mapping platform 103, machine learning system 119, computer vision system 117, services platform 113, services 115, UE 107, and/or vehicle 101. In another embodiment, the content providers 125 may manage access to a central repository of data, and offer a consistent, standard interface to data, such as a repository of the geographic database 123.

In one embodiment, the UE 107 and/or vehicle 101 may execute a software application 109 to capture image data or other observation data for dynamic object detection based on model switching according to the embodiments described herein. By way of example, the application 109 may also be any type of application that is executable on the UE 107 and/or vehicle 101, such as autonomous driving applications, mapping applications, location-based service applications, navigation applications, content provisioning services, camera/imaging application, media player applications, social networking applications, calendar applications, and the like. In one embodiment, the application 109 may act as a client for the mapping platform 103 and perform one or more functions associated with estimating the quality of sensor system pose data alone or in combination with the machine learning system 119.

By way of example, the UE 107 is any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 107 can support any type of interface to the user (such as "wearable" circuitry, etc.). In one embodiment, the UE 107 may be associated with the vehicle 101 or be a component part of the vehicle 101.

In one embodiment, the UE 107 and/or vehicle 101 are configured with various sensors for generating or collecting environmental image data (e.g., for processing by the mapping platform 103), related geographic data, etc. In one embodiment, the sensed data represent sensor data associated with a geographic location or coordinates at which the sensor data was collected. By way of example, the sensors may include a location sensor for gathering location data, a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture ground control point imagery, etc. for analysis), an audio recorder for gathering audio data, velocity sensors mounted on steering wheels of the vehicles, switch sensors for determining whether one or more vehicle switches are engaged, and the like.

The location sensors can apply various positioning assisted navigation technologies, e.g., global navigation satellite systems (GNSS), WiFi, Bluetooth, Bluetooth low energy, 2/3/4/5/6G cellular signals, ultra-wideband (UWB) signals, etc., and various combinations of the technologies to derive a more precise location. By way of example, a combination of satellite and network signals can derive a more precise location than either one of the technologies, which is important in many of the intermodal scenarios, e.g., when GNSS signals are unavailable in subway stations.

Other examples of sensors of the UE 107 and/or vehicle 101 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the UE 107 and/or vehicle 101 may detect the relative distance of the vehicle from a lane or roadway, the presence of other vehicles, pedestrians, traffic lights, potholes and any other objects, or a combination thereof. In one scenario, the sensors may detect weather data, traffic information, or a combination thereof. In one embodiment, the UE 107 and/or vehicle 101 may include GPS or other satellite-based receivers to obtain geographic coordinates from satellites for determining current location and time. Further, the location can be determined by visual odometry, triangulation systems such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

In one embodiment, the communication network 121 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the mapping platform 103, machine learning system 119, computer vision system 117, services platform 113, services 115, UE 107, vehicle 101, and/or content providers 125 communicate with each other and other components of the system 100 using well known, new or still developing protocols. In this context, a protocol includes a set of rules defining how the network nodes within the communication network 121 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 9:
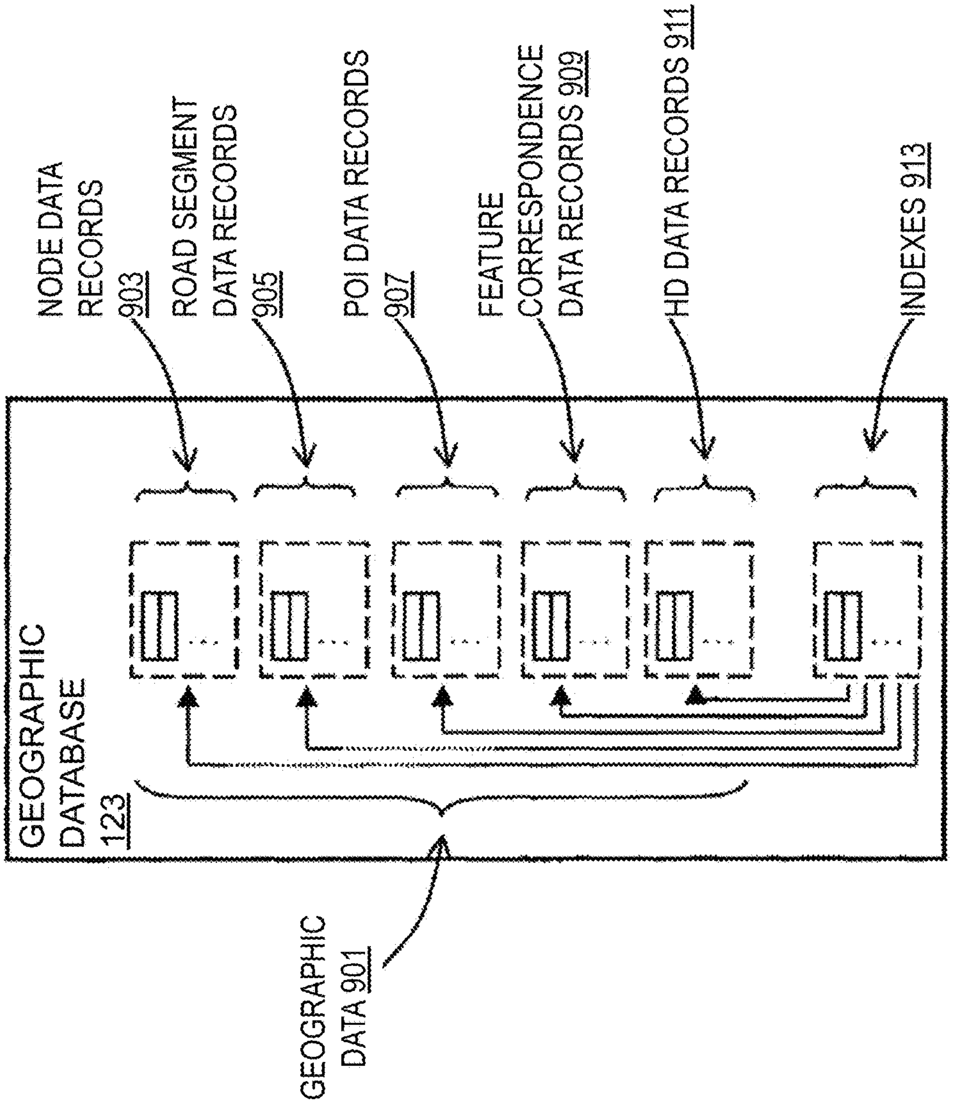
FIG. 9 is a diagram of a geographic database, according to one embodiment.

FIG. 9 is a diagram of a geographic database, according to one embodiment. In one embodiment, the geographic database 123 includes geographic data 901 used for (or configured to be compiled to be used for) mapping and/or navigation-related services, such as for video odometry based on the mapped features (e.g., lane lines, road markings, signs, etc.). In one embodiment, the geographic database 123 includes high resolution or high definition (HD) mapping data that provide centimeter-level or better accuracy of map features. For example, the geographic database 123 can be based on Light Detection and Ranging (LiDAR) or equivalent technology to collect billions of 3D points and model road surfaces and other map features down to the number lanes and their widths. In one embodiment, the HD mapping data (e.g., HD data records 911) capture and store details such as the slope and curvature of the road, lane markings, roadside objects such as signposts, including what the signage denotes. By way of example, the HD mapping data enable highly automated vehicles to precisely localize themselves on the road.

In one embodiment, geographic features (e.g., two-dimensional, or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 123.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 123 follows certain conventions. For example, links do not cross themselves and do not cross each other except at a node. Also, there are no duplicated shape points, nodes, or links. Two links that connect each other have a common node. In the geographic database 123, overlapping geographic features are represented by overlapping polygons. When polygons overlap, the boundary of one polygon crosses the boundary of the other polygon. In the geographic database 123, the location at which the boundary of one polygon intersects they boundary of another polygon is represented by a node.

In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 123 includes node data records 903, road segment or link data records 905, POI data records 907, feature correspondence data records 909, HD mapping data records 911, and indexes 913, for example. More, fewer, or different data records can be provided. In one embodiment, additional data records (not shown) can include cartographic ("cartel") data records, routing data, and maneuver data. In one embodiment, the indexes 913 may improve the speed of data retrieval operations in the geographic database 123. In one embodiment, the indexes 913 may be used to quickly locate data without having to search every row in the geographic database 123 every time it is accessed. For example, in one embodiment, the indexes 913 can be a spatial index of the polygon points associated with stored feature polygons.

In exemplary embodiments, the road segment data records 905 are links or segments representing roads, streets, or paths, as can be used in the calculated route or recorded route information for determination of one or more personalized routes. The node data records 903 are end points corresponding to the respective links or segments of the road segment data records 905. The road link data records 905 and the node data records 903 represent a road network, such as used by vehicles, cars, and/or other entities. Alternatively, the geographic database 123 can contain path segment and node data records or other data that represent pedestrian paths or areas in addition to or instead of the vehicle road record data, for example.

The road/link segments and nodes can be associated with attributes, such as functional class, a road elevation, a speed category, a presence or absence of road features, geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 123 can include data about the POIs and their respective locations in the POI data records 907. The geographic database 123 can also include data about places, such as cities, towns, or other communities, and other geographic features, such as bodies of water, mountain ranges, etc. Such place or feature data can be part of the POI data records 907 or can be associated with POIs or POI data records 907 (such as a data point used for displaying or representing a position of a city).

In one embodiment, the geographic database 123 can also include feature correspondence data records 909 for storing the identified object and/or map feature correspondences (e.g., image-to-image correspondences, image-to-ground correspondences, etc.), camera geometry parameters, location corrected images, location corrected features, location corrected camera models/poses, as well as other related data used or generated according to the various embodiments described herein. Features refer to any feature that is photo-identifiable in the image including, but not limited to, physical features on the ground that can be used as possible candidates for survey points. In other words, it is contemplated that features refer to a broader category of photo-identifiable features including survey points.

By way of example, the feature correspondence data records 909 can be associated with one or more of the node records 903, road segment records 905, and/or POI data records 907 to support dynamic model switching and/or model parameter switching for object detection. In this way, the records 909 can also be associated with or used to classify the characteristics or metadata of the corresponding records 903, 905, and/or 907.

In one embodiment, as discussed above, the HD mapping data records 911 model road surfaces and other map features to centimeter-level or better accuracy. The HD mapping data records 911 also include lane models that provide the precise lane geometry with lane boundaries, as well as rich attributes of the lane models. These rich attributes include, but are not limited to, lane traversal information, lane types, lane marking types, lane level speed limit information, and/or the like. In one embodiment, the HD mapping data records 911 are divided into spatial partitions of varying sizes to provide HD mapping data to vehicles 101 and other end user devices with near real-time speed without overloading the available resources of the vehicles 101 and/or devices (e.g., computational, memory, bandwidth, etc. resources).

In one embodiment, the HD mapping data records 911 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 911.

In one embodiment, the HD mapping data records 911 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

In one embodiment, the geographic database 123 can be maintained by the content provider 125 in association with the services platform 113 (e.g., a map developer). The map developer can collect geographic data to generate and enhance the geographic database 123. There can be different ways used by the map developer to collect data. These ways can include obtaining data from other sources, such as municipalities or respective geographic authorities. In addition, the map developer can employ field personnel to travel by vehicle (e.g., vehicle 101 and/or UE 107) along roads throughout the geographic region to observe features and/or record information about them, for example. Also, remote sensing, such as aerial or satellite photography, can be used.

The geographic database 123 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 101 or UE 107, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for providing dynamic model switching and/or model parameter switching for object detection may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

FIG. 10 illustrates a computer system 1000 upon which an embodiment of the invention may be implemented. Computer system 1000 is programmed (e.g., via computer program code or instructions) to provide dynamic model switching and/or model parameter switching as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1010 includes one or more parallel conductors of information so that information is transferred quickly among devices coupled to the bus 1010. One or more processors 1002 for processing information are coupled with the bus 1010.

A processor 1002 performs a set of operations on information as specified by computer program code related to providing dynamic model switching and/or model parameter switching. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1000 also includes a memory 1004 coupled to bus 1010. The memory 1004, such as a random access memory (RANI) or other dynamic storage device, stores information including processor instructions for providing dynamic model switching and/or model parameter switching. Dynamic memory allows information stored therein to be changed by the computer system 1000. RANI allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk, or flash card, for storing information, including instructions, that persists even when the computer system 1000 is turned off or otherwise loses power.

Information, including instructions for providing dynamic model switching and/or model parameter switching, is provided to the bus 1010 for use by the processor from an external input device 1012, such as a keyboard containing alphanumeric keys operated by a human user, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT) or a liquid crystal display (LCD), or plasma screen or printer for presenting text or images, and a pointing device 1016, such as a mouse or a trackball or cursor direction keys, or motion sensor, for controlling a position of a small cursor image presented on the display 1014 and issuing commands associated with graphical elements presented on the display 1014. In some embodiments, for example, in embodiments in which the computer system 1000 performs all functions automatically without human input, one or more of external input device 1012, display device 1014 and pointing device 1016 is omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of application specific ICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners, and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic, or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 105 for providing dynamic model switching and/or model parameter switching to the UE 107.

The term computer-readable medium is used herein to refer to any medium that participates in providing information to processor 1002, including instructions for execution. Such a medium may take many forms, including, but not limited to, non-volatile media, volatile media, and transmission media. Non-volatile media include, for example, optical or magnetic disks, such as storage device 1008. Volatile media include, for example, dynamic memory 1004. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization, or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 1078 typically provides information communication using transmission media through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090.

A computer called a server host 1092 connected to the Internet hosts a process that provides a service in response to information received over the Internet. For example, server host 1092 hosts a process that provides information representing video data for presentation at display 1014. It is contemplated that the components of system can be deployed in various configurations within other computer systems, e.g., host 1082 and server 1092.

Figure 11:
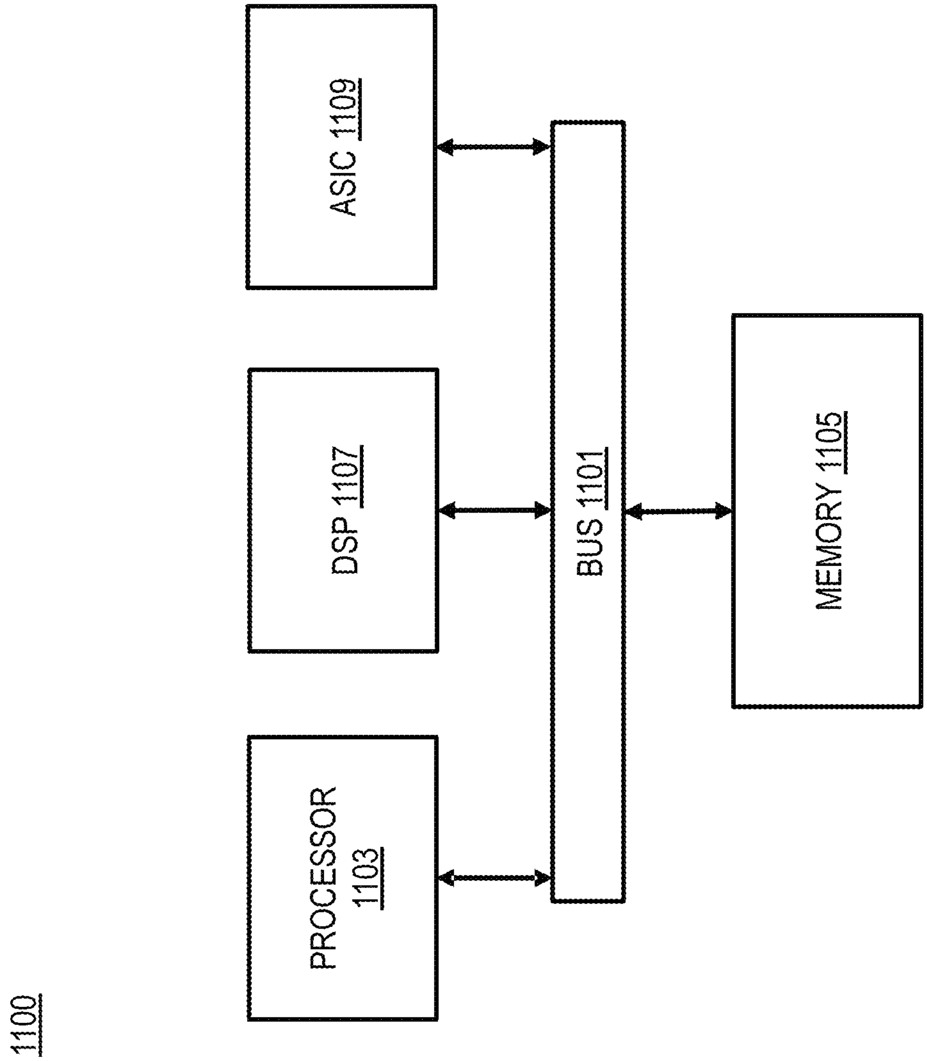
FIG. 11 is a diagram of a chip set that can be used to implement an embodiment.

FIG. 11 illustrates a chip set 1100 upon which an embodiment of the invention may be implemented. Chip set 1100 is programmed to provide dynamic model switching and/or model parameter switching as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to provide dynamic model switching and/or model parameter switching. The memory 1105 also stores the data associated with or generated by the execution of the inventive steps.

Figure 12:
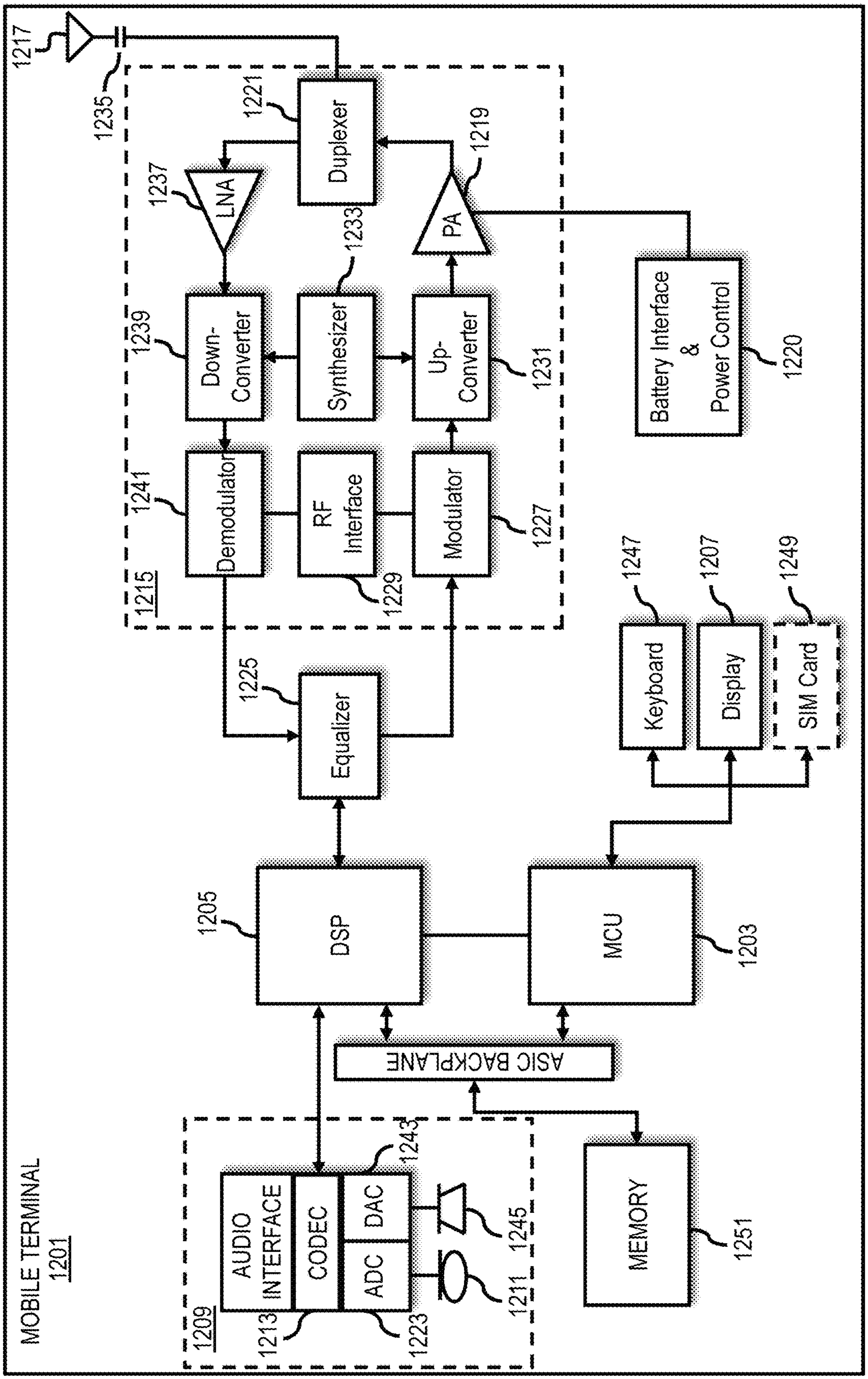
FIG. 12 is a diagram of a mobile terminal (e.g., handset, vehicle, or component thereof) that can be used to implement an embodiment.

FIG. 12 is a diagram of exemplary components of a mobile terminal (e.g., handset, vehicle, or component thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile station functions that offer automatic contact matching. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile station 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203—which can be implemented as a Central Processing Unit (CPU) (not shown).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile station 1201 to provide dynamic model switching and/or model parameter switching. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the station. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile station 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1251 may be, but not limited to, a single memory, CD, DVD, ROM, RAM, EEPROM, optical storage, or any other non-volatile or non-transitory storage medium capable of storing digital data.

An optionally incorporated SIM card 1249 carries, for instance, important information, such as the cellular phone number, the carrier supplying service, subscription details, and security information. The SIM card 1249 serves primarily to identify the mobile station 1201 on a radio network. The card 1249 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:

providing a plurality of machine learning model parameter sets for a machine learning model, wherein the plurality of machine learning model parameter sets is based on a plurality of respective regional differences;

determining a context of a device;

selecting a machine learning model parameter set from the plurality of machine learning model parameter sets based on the context, wherein the selected machine learning model parameter set comprises first connection weights and first connection biases, and wherein the first connection weights and the first connection biases are pre-trained for the machine learning model based on the context;

configuring the machine learning model to perform a base functionality in the device by switching a current machine learning model parameter set of the machine learning model with the selected machine learning model parameter set, wherein the current machine learning model parameter set comprises second connection weights and second connection biases, and wherein the second connection weights and the second connection biases are pre-trained for the machine learning model based on a different context; and using the configured machine learning model to improve an accuracy of the base functionality, wherein the base functionality is associated with processing sensor data collected by the device to detect one or more road attributes.

2. The method of claim 1, wherein the context includes a geographic location of the device.

3. The method of claim 1, further comprising:

initiating a training of the machine learning model using a plurality of respective regional datasets to provide for the plurality of respective regional differences in the plurality of machine learning model parameter sets.

4. The method of claim 1, wherein one or more parameters in the plurality of parameter sets include a connection weight parameter, a bias value, an activation function, or a combination thereof.

5. The method of claim 1, wherein the device is a mobile edge device capable of moving between a plurality of geographic regions.

6. The method of claim 1, wherein the context is determined dynamically and the machine learning model parameter set is selected dynamically as the device moves.

7. The method of claim 1, wherein the base functionality includes feature detection, feature classification, or a combination thereof based on sensor data collected using one or more sensors of the device.

8. The method of claim 1, wherein the base functionality includes road hazard detection, road furniture detection, road sign detection, or a combination thereof.

9. The method of claim 1, wherein the machine learning model is a feature detection model for detecting one or more features from image data collected by the device.

10. The method of claim 1, wherein the device is a vehicle or is associated with the vehicle, and wherein the base functionality includes an autonomous operation of the vehicle.

11. The method of claim 1, wherein the machine learning model is included in a software development kit used for compiling an application package for execution by the device.

12. The method of claim 1, wherein the selected machine learning model parameter set is downloaded to or enabled at the device on demand.

13. An apparatus comprising:

at least one processor; and at least one memory including computer program code for one or more programs, the at least one memory and the computer program code configured to, with the at least one processor, cause the apparatus to perform at least the following, provide a plurality of machine learning model parameter sets for a machine learning model, wherein the plurality of machine learning model parameter sets is based on a plurality of respective regional differences;

determine a context of a device;

select a machine learning model parameter set from the plurality of machine learning model parameter sets based on the context, wherein the selected machine learning model parameter set comprises first connection weights and first connection biases, and wherein the first connection weights and the first connection biases are pre-trained for the machine learning model based on the context;

configure the machine learning model to perform a base functionality in the device by switching a current machine learning model parameter set of the machine learning model with the selected machine learning model parameter set, wherein the current machine learning model parameter set comprises second connection weights and second connection biases, and wherein the second connection weights and the second connection biases are pre-trained for the machine learning model based on a different context; and use the configured machine learning model to improve an accuracy of the base functionality, wherein the base functionality is associated with processing sensor data collected by the device to detect one or more road attributes.

14. The apparatus of claim 13, wherein the context includes a geographic location of the device.

15. The apparatus of claim 13, wherein the apparatus is further caused to:

initiate a training of the machine learning model using a plurality of respective regional datasets to provide for the plurality of respective regional differences in the plurality of machine learning model parameter sets.

16. The apparatus of claim 13, wherein one or more parameters in the plurality of parameter sets include a connection weight parameter, a bias value, an activation function, or a combination thereof.

17. The apparatus of claim 13, wherein the device is a mobile edge device capable of moving between a plurality of geographic regions.

18. A non-transitory computer-readable storage medium carrying one or more sequences of one or more instructions which, when executed by one or more processors, cause an apparatus to at least perform the following steps:

processing sensor data to determine at least one context;

causing, at least in part, a transmission of the at least one context to a server that provides a plurality of machine learning model parameter sets for a single machine learning model architecture trained to detect one or more road attributes;

receiving from the server at least one machine learning model parameter set of the plurality of machine learning model parameter sets based on the at least one context, wherein the at least one machine learning model parameter set comprises first connection weights and first connection biases, and wherein the first connection weights and the first connection biases are pre-trained for the single machine learning model based on the at least one context;

configuring the single machine learning model based on the at least one machine learning model parameter set to detect the one or more road attributes by switching a current machine learning model parameter set of the single machine learning model with the received machine learning model parameter set, wherein the current machine learning model parameter set comprises second connection weights and second connection biases, and wherein the second connection weights and the second connection biases are pre-trained for the single machine learning model based on a different context; and using the configured single machine learning model to improve an accuracy of a base functionality, wherein the base functionality is associated with processing sensor data collected by the device to detect the one or more road attributes.

19. The non-transitory computer-readable storage medium of claim 18, wherein the at least one context includes a geographic location of a device.

20. The non-transitory computer-readable storage medium of claim 19, wherein the at least one machine learning model is provided to the device capable of moving between a plurality of geographic regions.

* * * * *